US007702366B2

(12) United States Patent
Suzuki et al.

(10) Patent No.: US 7,702,366 B2
(45) Date of Patent: Apr. 20, 2010

(54) BASE STATION AND BASE STATION CONTROLLER FOR TRANSMISSION OF PRIORITIZED PACKETS

(75) Inventors: Takaaki Suzuki, Ayase (JP); Junpei Watanabe, Yokohama (JP); Akio Kawase, Fujisawa (JP); Shingo Sasaki, Yokohama (JP); Hideo Aoe, Yokohama (JP)

(73) Assignees: Hitachi Communication Technologies, Ltd. (JP); Hitachi Information & Communication Engineering, Ltd. (JP)

( * ) Notice: Subject to any disclaimer, the term of this patent is extended or adjusted under 35 U.S.C. 154(b) by 773 days.

(21) Appl. No.: 11/640,844

(22) Filed: Dec. 19, 2006

(65) Prior Publication Data

US 2007/0201501 A1 Aug. 30, 2007

(30) Foreign Application Priority Data

Feb. 28, 2006 (JP) .............................. 2006-051584

(51) Int. Cl.
*H04W 4/00* (2009.01)
*H04L 12/56* (2006.01)
*H04J 3/24* (2006.01)
*H04M 1/00* (2006.01)
*H04B 7/00* (2006.01)
*H04B 1/38* (2006.01)

(52) U.S. Cl. .................... 455/561; 455/512; 455/514; 455/550.1; 370/412; 370/349; 370/395.42

(58) Field of Classification Search .............. 455/404.1, 455/418, 500, 507, 512, 514, 527, 550.1, 455/560–561; 370/310, 313, 328–329, 338–339, 370/395.42, 341, 348–349, 371, 378, 381, 370/383, 395.52, 395.71, 412–418, 429, 370/444–445, 458, 468, 473–474, 913; 709/206–207, 709/240

See application file for complete search history.

(56) References Cited

U.S. PATENT DOCUMENTS 6,980,793 B2 * 12/2005 Lee ............................. 455/406

(Continued)

FOREIGN PATENT DOCUMENTS

JP 08-191328 7/1996

OTHER PUBLICATIONS

Cdma2000 High Rate Packet Data Air Interface Specification, $3^{rd}$ Generation Partnership Project 2 "3GPP2", version 4.0, Oct. 25, 2002.

*Primary Examiner*—Meless N Zewdu
(74) *Attorney, Agent, or Firm*—Antonelli, Terry, Stout & Kraus, LLP.

(57) ABSTRACT

Terminals #1 to #3 which have already been connected and a terminal #4 which wants to make a new connection send packets to a base station in that order. The base station queues the packets from the terminals #1 to #3 at a non-priority queue and the packet from the terminal #4 at a priority queue. For example, a predetermined amount of packets from a new connection is queued at the priority queue. Packets in the priority queue are dequeued with priority. Therefore, the packet sent from the terminal #4 is first sent to a base-station controller, and then the packets sent from the terminals #1 to #3 are sent to the base-station controller. As a result, the base-station controller first receives the packet sent from the terminal #4, and the period of time required for the terminal #4 to establish a connection is reduced.

15 Claims, 19 Drawing Sheets

U.S. PATENT DOCUMENTS

| | | | | |
|---|---|---|---|---|
| 7,496,034 | B2* | 2/2009 | Fukunaga et al. | 370/230 |
| 7,577,123 | B2* | 8/2009 | Hashimoto et al. | 370/338 |
| 2003/0186724 | A1 | 10/2003 | Tsutsumi et al. | |
| 2003/0219014 | A1* | 11/2003 | Kotabe et al. | 370/375 |
| 2004/0156380 | A1* | 8/2004 | Silverman et al. | 370/428 |
| 2005/0129036 | A1* | 6/2005 | Sawabe | 370/401 |

\* cited by examiner

BASE STATION AND BASE STATION CONTROLLER FOR TRANSMISSION OF PRIORITIZED PACKETS

BACKGROUND OF THE INVENTION

The present invention relates to base stations and base-station control apparatuses, and more particularly, to a base station and a base-station control apparatus for performing packet priority control in a packet communication system that handles a plurality of subscribers.

In addition to conventional wired communication networks, wireless communication networks (hereinafter called wireless communication systems) that use wireless terminals and a wireless communication apparatus have been introduced. In the wireless communication systems, code division multiple access (CDMA) communications, which code-multiplexes signals, such as audio signals, with spreading code to perform communications have been widespread as well as time division multiple access (TDMA) communications, which time-division multiplexes signals, such as audio signals, to perform communications. The CDMA method provides easier connection establishment and less disconnection, and also has a better sound quality than a personal digital cellular (PDC) method. In addition, since the CDMA method uses spectrum spreading in a wide band, it is immune to interference waves and noise.

The packet communication speed has been increased by cdmaOne, which is a communication method using the CDMA technology, and cdma2000, which is an upper standard of the cdmaOne. Especially in cdma2000 1×EV-DO, which is a data communication standard included in cdma2000, a maximum downstream data rate of 2.4 Mbps has been implemented.

In the wireless communication systems, a base station, serving as a wireless communication apparatus, communicates with a wireless terminal in an area where radio waves sent from the base station reach, which is called a cell. Generally, the cell has a radius of about several kilometers. About 200 users, for example, can perform communications in the cell. The wireless communication apparatus and another communication apparatus communicate with each other by successively handling packet data sent to and received from the users.

When a plurality of users send a large amount of packet data to impose heavy traffic on the line, if a user wants to make a new connection to a service, the connection is not established soon in some cases. Alternately, even when that connection is established, no response is sent back soon from an application program of the destination. To eliminate a sense of unfairness perceived by the users where a later attempt to make a connection is more likely to fail, it is demanded that a delay of a new-connection packet be eliminated.

Currently, the quality of service (QoS), which ensures a packet frequency band, is provided as a technology for guaranteeing that the users can use constant-rate transmission and reception. Irrespective of whether the QoS is provided or not, a technology for providing the users with a uniform service is also disclosed (for example, in Japanese Unexamined Patent Application Publication No. Hei-08-191328).

In that technology, a priority level is assigned to each of a plurality of packet communication terminals, and an automatic route selection apparatus sends a packet sent from a communication terminal either to the shortest route or to a bypass route according to the assigned priority level of the communication terminal. More specifically, packets having higher priority levels are sent to the shortest routes with priority, and packets having lower priority levels are sent to bypass routes. As a result, the packets having lower priority levels are automatically bypassed, and the packets having higher priority levels are sent to the shortest routes with priority without being disturbed by the packets having lower priority levels.

SUMMARY OF THE INVENTION

The QoS technology is important for services which require no-delay and no-stop communications, such as real-time distributions (radio- and TV-type services) of sound and moving images, and TV phones. Since the same successive processing as before is performed until a connection is established, the time required for a connection is not reduced. Therefore, if a terminal or a user having a high priority level requests a connection, for example, the connection is not soon made or a response is not soon sent back, as described above.

The technology disclosed in Japanese Unexamined Patent Application Publication No. Hei-08-191328, described above, is used after priority-level information is obtained. Until the priority-level information is obtained, since successive packet processing is performed, a long connection time has not yet been eliminated.

In view of the points described above, it is an object of the present invention to provide a base station and a base-station control apparatus that handle packets sent from a terminal which has not yet been connected and wants to make a connection to a radio communication system, with priority, compared with packets sent from the other user terminals, to reduce the time required for a connection. It is one of objects of the present invention that an application program would be executed immediately.

It is one of objects of the present invention that, when a terminal which wants to make a new connection sends a packet for the new connection to establish the connection, the packet can be transmitted earlier than the other user packets from a radio communication apparatus to another communication apparatus such that a user who has applied for a QoS service is prevented from being not subjected to the QoS service until a connection is established and is not handled in the same manner as those who have not applied for the QoS service. It is one of objects of the present invention that the above-described priority control is performed only when the specified priority condition is satisfied, and otherwise, all packets are handled in an identical manner to eliminate a sense of unfairness among the users.

It is one of objects of the present invention to provide a packet communication system which has a function to send user packets through a plurality of priority and non-priority routes and, processes packets from a user who wants to make a new connection, by using the priority route for a predetermined period of time. With this, it is one of objects of the present invention that a connection time would be maintained within specified period. It is one of objects of the present invention to handle packets sent from users other than a user who wants to make a new connection through a non-priority route, and, to reduce waiting time of the user who wants to make a new connection. In addition, it is one of objects of the present invention to comprise a plurality of routes between the BS and BSC where low-speed lines are used in many cases.

It is one of objects of the present invention that the amount of packets flowing through the priority route is suppressed to about 1% of the amount of packets flowing through the non-priority route and, a delay time caused by transfer would be reduced. As a result, it is one of objects of the present invention that a connection time would be maintained within specified period. Further, a predetermined amount of packets is sent with priority from the time when a new connection is made, for example, to send traffic, with priority, required for terminal authentication or user authentication for a connection and, application-program activation. It is one of objects of the present invention that after sending the predetermined amount of packets, all users are handled uniformly to eliminate a sense of unfairness among the users.

In light of the circumstances described above, in the present invention, for example, a packet for new connection is sent and received with priority to be established the new connection within a predetermined period.

In a conventional wireless communication system, in a case that a terminal to make a new connection starts connecting when a channel has received packets more than a communication band, since the packet for new connection is queued at a waiting queue, it need sufficient time to establish the new connection. In the present invention, predetermined amount of packets from user for new connection is transmitted using priority channel, to maintain a connection time of the new connection within a predetermined time. Since a user who has established a connection communicates using non-priority channel, a user who wants to make a new connection are not handled with long delay.

In the wireless communication system, a first wireless terminal which would make a new connection and a second wireless terminal which has been connected perform wireless communication with a base station. The wireless communication system has two communication paths which are priority channel and non-priority channel between the base station and a base station network. When the base station communicates with the base station network, the second wireless terminal is handled with priority by using the priority channel.

According to the first solving means of this invention, there is provided a base station comprising:

a radio-signal processing section for performing conversion between an electric signal and a radio signal received from and transmitted to a terminal through an antenna;

a communication processing section for applying predetermined communication processing to the electric signal from the radio-signal processing section;

a queue section for buffering a packet to a base station network and for sending the packet; and a control section for sending with priority a predetermined amount of packets used by the terminal to newly connect to the base station network, wherein the control section comprises:

a packet analysis module for receiving a packet from the communication processing section, for generating packet analysis information that includes a terminal identifier of a transmission source by referring to the packet, and for outputting the received packet and the packet analysis information; and a count module for receiving the packet analysis information from the packet analysis module, for obtaining, for each terminal identifier included in the packet analysis information, the amount of data received from when a first packet is received from the terminal to the current time, or an elapsed time from when the first packet is received from the terminal to the current time, for setting priority-level information to priority in the case that the amount of data or the elapsed time is less than a predetermined threshold, and for setting the priority-level information to non-priority in the case that the amount of data or the elapsed time is not less than the predetermined threshold, and the queue section comprises:

a priority queue where a packet for which the priority-level information is priority is queued;

a non-priority queue where a packet for which the priority-level information is non-priority is queued;

a priority-level decision module for queuing the packet at one of the priority queue and the non-priority queue according to the priority-level information set by the count module; and a selection and transmission module for, when the priority queue has a packet, dequeuing the packet from the priority queue and sending the packet to the base station network, and for, when the priority queue does not have a packet but the non-priority queue has a packet, dequeuing the packet from the non-priority queue and sending the packet to the base station network.

According to the second solving means of this invention, there is provided a base station comprising:

a radio-signal processing section for performing conversion between an electric signal and a radio signal received from and transmitted to a terminal through an antenna;

a communication processing section for applying predetermined communication processing to the electric signal from the radio-signal processing section;

a queue section for buffering a packet to a base station network and for sending the packet; and a control section for sending with priority a predetermined amount of packets used by the terminal to newly connect to the base station network, wherein the control section comprises:

a packet analysis module for receiving a packet from the communication processing section, for generating packet analysis information that includes a terminal identifier of a transmission source and a QoS type by referring to the packet, and for outputting the received packet and the packet analysis information; and a count module for receiving the packet analysis information from the packet analysis module, for obtaining, for each terminal identifier included in the packet analysis information, the amount of data received from when a first packet is received from the terminal to the current time, or an elapsed time from when the first packet is received from the terminal to the current time, for setting priority-level information to priority in the case that the amount of data or the elapsed time is less than a predetermined threshold, and for setting the priority-level information to non-priority in the case that the amount of data or the elapsed time is not less than the predetermined threshold, and the queue section comprises:

a priority queue for each QoS type, where a packet for which the priority-level information is priority is queued;

a non-priority queue for each QoS type, where a packet for which the priority-level information is non-priority is queued;

a priority-level decision module for queuing the received packet at one of the priority queue for each QoS type and the non-priority queue for each QoS type according to the QoS type included in the packet analysis information and the priority-level information set by the count module; and a selection and transmission module which performs, for each QoS type in a descending order of the priority levels of QoS types, when the priority queue for the QoS type has a packet, dequeuing the packet from the priority queue and sending the packet to the base station network, and for, when the priority queue for the QoS type does not have a packet but the non-priority queue for the QoS type has a packet, dequeuing the packet from the non-priority queue and sending the packet to the base station network.

According to the third solving means of this invention, there is provided a base-station control apparatus comprising:

a first interface for communicating with a base station;

a second interface for communicating with a network;

a packet processing section for applying signal processing that includes switching to a signal exchanged between the first interface and the second interface;

a queue section for buffering a packet to the base station and for sending the packet; and a control section for sending with priority a predetermined amount of packets used by a terminal to newly connect to a base station network, wherein the control section comprises:

a packet analysis module for receiving a packet from the packet processing section, for generating packet analysis information that includes a terminal identifier of a transmission destination by referring to the packet, and for outputting the received packet and the packet analysis information; and a count module for receiving the packet analysis information from the packet analysis module, for obtaining, for each terminal identifier included in the packet analysis information, the amount of data sent to the terminal from when a first packet is sent to the current time, or an elapsed time from when the first packet is sent to the terminal to the current time, for setting priority-level information to priority in the case that the amount of data or the elapsed time is less than a predetermined threshold, and for setting the priority-level information to non-priority in the case that the amount of data or the elapsed time is not less than the predetermined threshold, and the queue section comprises:

a priority queue where a packet for which the priority-level information is priority is queued;

a non-priority queue where a packet for which the priority-level information is non-priority is queued;

a priority-level decision module for queuing the received packet at one of the priority queue and the non-priority queue according to the priority-level information set by the count module; and a selection and transmission module for, when the priority queue has a packet, dequeuing the packet from the priority queue and sending the packet to a base station corresponding to the terminal of the transmission destination, and for, when the priority queue does not have a packet but the non-priority queue has a packet, dequeuing the packet from the non-priority queue and sending the packet to a base station corresponding to the terminal of the transmission destination.

According to the fourth solving means of this invention, there is provided a base-station control apparatus comprising:

a first interface for communicating with a base station;

a second interface for communicating with a network;

a packet processing section for applying signal processing that includes switching to a signal exchanged between the first interface and the second interface;

a queue section for buffering a packet to the base station and for sending the packet; and a control section for sending with priority a predetermined amount of packets used by a terminal to newly connect to a base station network, wherein the control section comprises:

a packet analysis module for receiving a packet from the packet processing section, for generating packet analysis information that includes a terminal identifier of a transmission destination and a QoS type by referring to the packet, and for outputting the received packet and the packet analysis information; and a count module for receiving the packet analysis information from the packet analysis module, for obtaining, for each terminal identifier included in the packet analysis information, the amount of data sent to the terminal from when a first packet is sent to the current time, or an elapsed time from when the first packet is sent to the terminal to the current time, for setting priority-level information to priority in the case that the amount of data or the elapsed time is less than a predetermined threshold, and for setting the priority-level information to non-priority in the case that the amount of data or the elapsed time is not less than the predetermined threshold, and the queue section comprises:

a priority queue for each QoS type, where a packet for which the priority-level information is priority is queued;

a non-priority queue for each QoS type, where a packet for which the priority-level information is non-priority is queued;

a priority-level decision module for queuing the received packet at one of the priority queue for each QoS type and the non-priority queue for each QoS type according to the QoS type included in the packet analysis information and the priority-level information set by the count module; and a selection and transmission module which performs, for each QoS type in a descending order of the priority levels of QoS types, when the priority queue for the QoS type has a packet, dequeuing the packet from the priority queue and sending the packet to a base station corresponding to the terminal of the transmission destination, and for, when the priority queue for the QoS type does not have a packet but the non-priority queue for the QoS type has a packet, dequeuing the packet from the non-priority queue and sending the packet to a base station corresponding to the terminal of the transmission destination.

The present invention provides a base station and a base-station control apparatus that handle packets sent from a terminal which has not yet been connected and wants to make a connection to a radio communication system, with priority, compared with packets sent from the other user terminals, to reduce the time required for a connection. According to the present invention, an application program can be executed immediately.

According to the present invention, when a terminal which wants to make a new connection sends a packet for the new connection to establish the connection, the packet can be transmitted earlier than the other user packets from a radio communication apparatus to another communication apparatus such that a user who has applied for a QoS service is prevented from being not subjected to the QoS service until a connection is established and is not handled in the same manner as those who have not applied for the QoS service.

According to the present invention, the above-described priority control is performed only when the specified priority condition is satisfied, and otherwise, all packets are handled in an identical manner to eliminate a sense of unfairness among the users.

In the present invention, a packet communication system provided with a function to send user packets through a plurality of priority and non-priority routes processes packets from a user who wants to make a new connection, by using a priority route for a predetermined period of time. With this, a connection time can be maintained within a predetermined period. According to the present invention, since packets sent from users other than a user who wants to make a new connection are usually handled through a non-priority route, packets from the user who wants to make a new connection are not handled with a long delay. In addition, according to the present invention, since a plurality of routes is made between the BS and BSC, it is expected that the present invention gives advantages. According to the present invention, since low-speed lines are used between the BS and BSC in many cases, further advantages are expected. With this structure, only a modification made at the base station provides a system that can reduce the connection time without modifying an application program.

According to the present invention, since the amount of packets flowing through the priority route is suppressed to about 1% of the amount of packets flowing through the non-priority route, a delay time caused by transfer can be reduced. As a result, a constant connection time can be maintained. Further, according to the present invention, when a predetermined amount of packets is sent with priority from the time when a new connection is made, for example, terminal authentication or user authentication required for a connection and traffic required for application-program activation can be performed with priority. After the predetermined amount of packets, all users are handled uniformly to eliminate a sense of unfairness among the users.

DESCRIPTION OF THE PREFERRED EMBODIMENTS

The structure of a wireless communication system according to an embodiment of the present invention and packet priority control in the wireless communication system will be described below in detail with reference to the drawings. The wireless communication system mainly provides packet communication.

Figure 1:
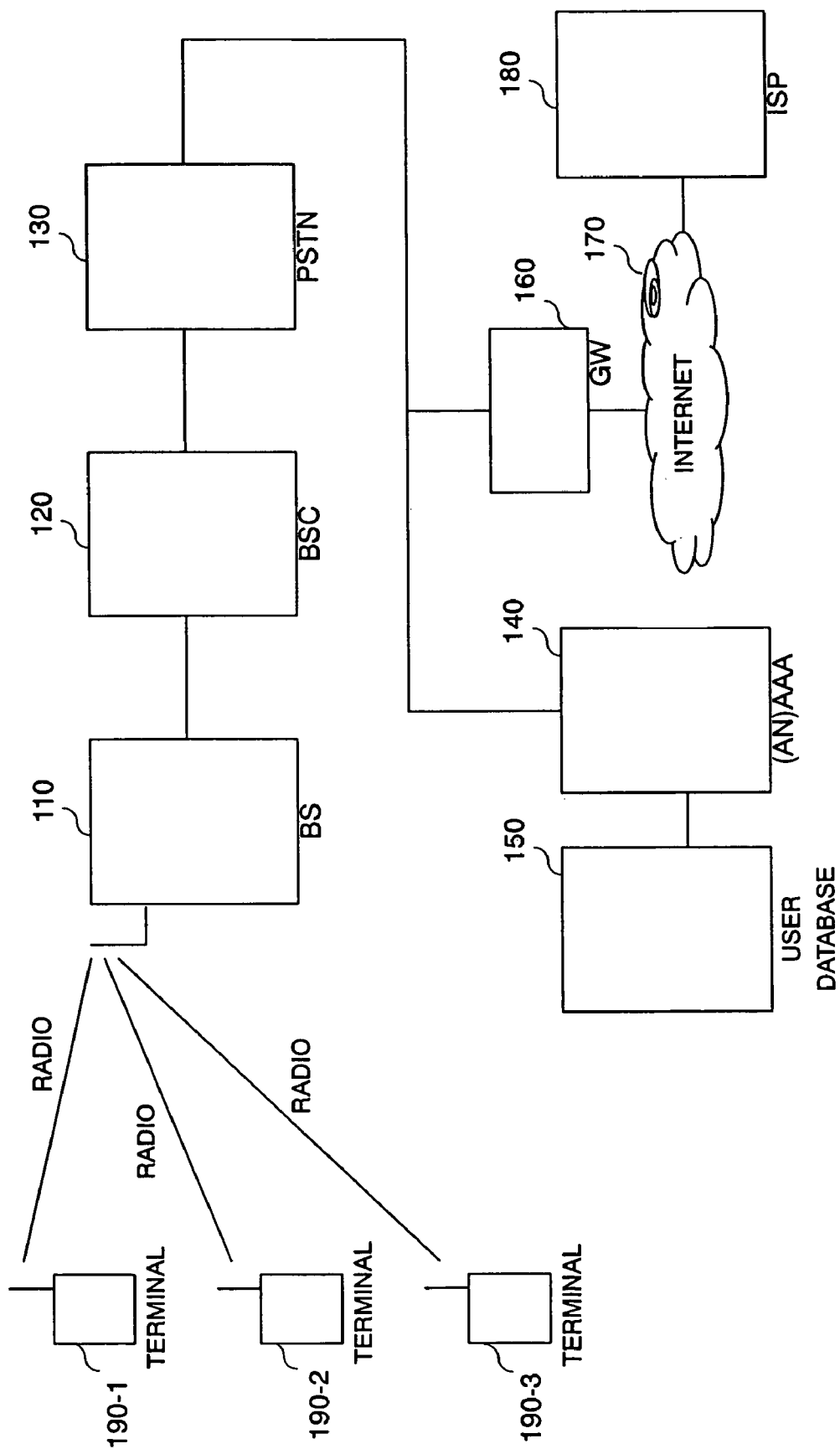
FIG. 1 is a view showing an example structure of a radio communication system according to an embodiment of the present invention.

FIG. 1 is a view showing the structure of the wireless communication system.

The wireless communication system includes a base station (hereinafter called a BS) 110 serving as a wireless communication apparatus for communicating with user terminals 190-1 to 190-3, a base-station controller (hereinafter called a BSC) 120 for connecting the BS 110 to a public switch telephone network (hereinafter called a PSTN) 130 with another communication network and for managing and controlling the BS 110, a terminal authentication server (access node for authentication, authorization, and accounting, hereinafter called an (AN)AAA) 140 for authenticating the users, a user database 150, and a gateway (hereinafter called a GW) 160 for relaying packets used for connecting to an Internet service provider (hereinafter called an ISP) 180 through the Internet 170.

The plurality of user terminals 190-1 to 190-3 are connected to the BS 110 by radio. Each terminal 190 sends or receives packets to and from (communicates with) the AAA 140 or the ISP 180 through the BSC 120 and the PSTN 130. The above-described wireless communication system may employ any radio technology, such as TDMA, CDMA, or FDMA.

Figure 2:
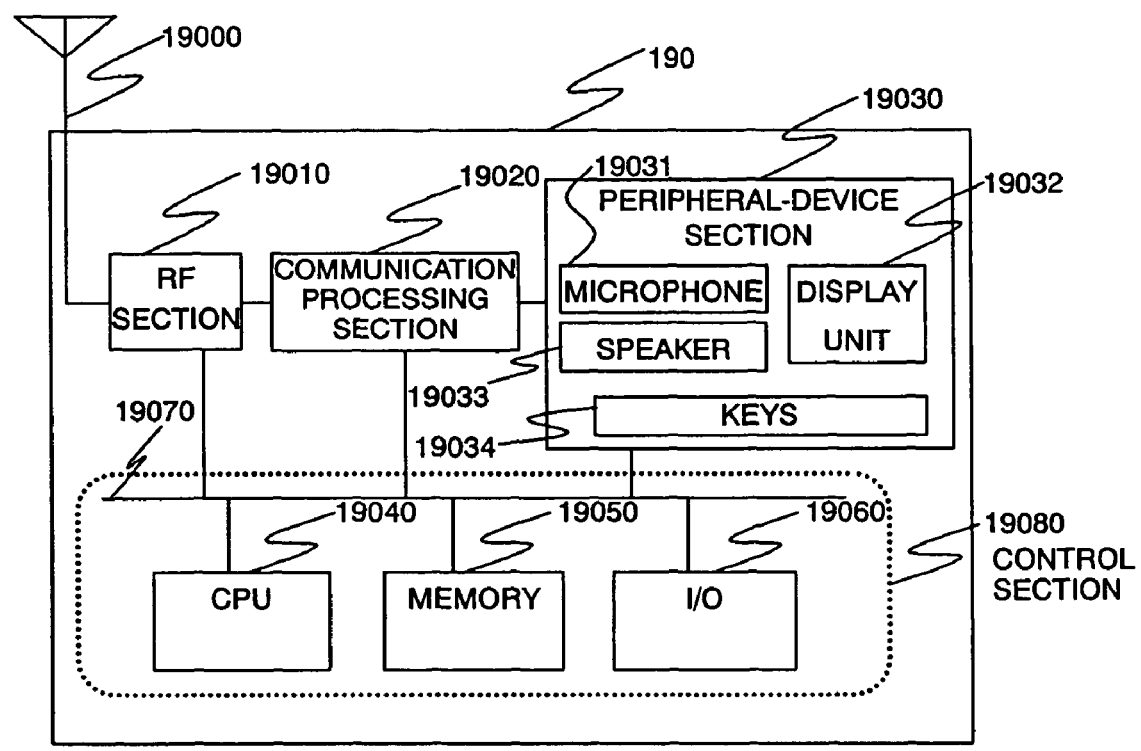
FIG. 2 is a view showing the hardware structure of a terminal.

FIG. 2 is a block diagram showing the hardware structure of the terminal 190.

The terminal 190 includes an antenna 19000 for sending and receiving a radio signal, a radio-wave-signal processing section (RF section) 19010 for converting the radio signal to an electric signal, a communication processing section 19020 for applying predetermined signal processing (such as signal termination, protocol conversion, failure monitoring) to the electric signal, a peripheral-device section 19030 for inputting and outputting signals sent and received by the owner of the terminal, and a control section 19080 for controlling the whole of the terminal 190. The peripheral-device section 19030 includes a microphone 19031 for inputting sound, a speaker 19033 for outputting sound, a display unit 19032 for displaying characters and images, and keys 19034 for inputting data and control signals (such as that for specifying a connection destination). The control section 19080 includes a CPU 19040 serving as a processor for controlling the operations of the whole of the terminal 190, a memory 19050 for storing an operation program and various data items necessary for the operations, and an I/O module 19060 for sending and receiving signals to and from an external unit. A control bus 19070 connects the above-described sections. The terminals 190-1, 190-2, and 190-3, shown in FIG. 1, have the identical structure shown in FIG. 2.

Figure 3:
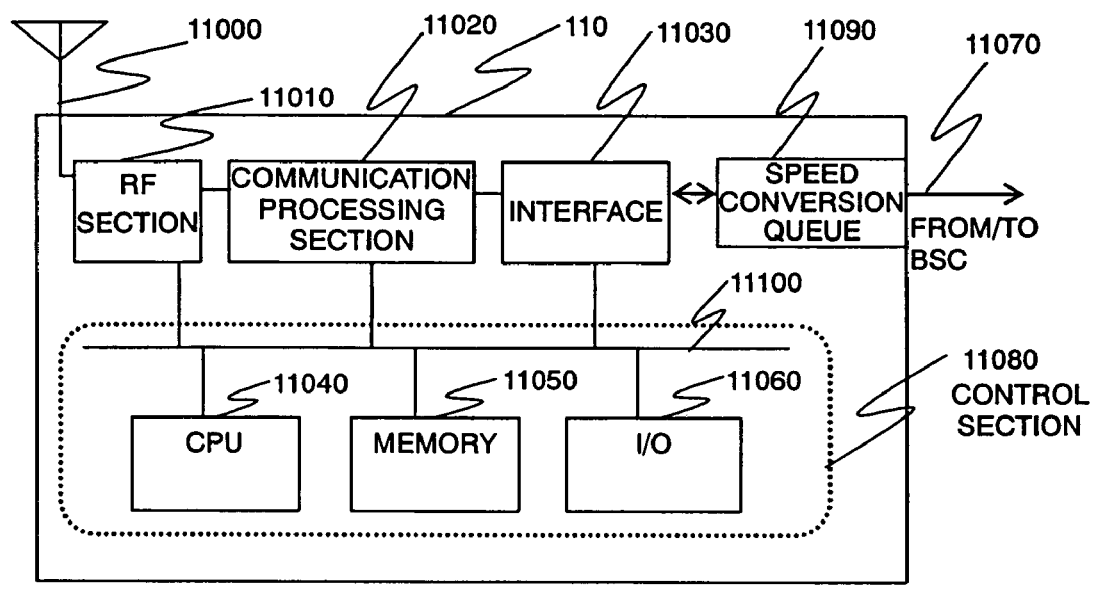
FIG. 3 is a view showing the hardware structure of a base station (BS).

FIG. 3 is a block diagram showing an example structure of the wireless communication apparatus (BS 110).

The BS 110 includes, for example, an antenna 11000 for sending and receiving a radio signal, an RF section 11010 for converting the radio signal to an electric signal, a communication processing section 11020 for applying predetermined signal processing (such as signal termination, protocol conversion, failure monitoring) to the electric signal, an interface 11030 for sending and receiving signals to and from the BSC 120, a speed conversion queue 11090, and a control section 11080 for controlling the whole of the BS 110. The control section 11080 includes a CPU 11040 serving as a processor for controlling the operations of the whole of the BS 110, a memory 11050 for storing an operation program and various data items necessary for the operations, and an I/O module 11060 for sending and receiving signals to and from an external unit. A control bus 11100 connects the above-described sections.

The speed conversion queue 11090 buffers data for transmission and reception because the BS 110 and the BSC 120 have a difference in speed (for example, a speed difference between FastEther and SPAN T1×3) for packet transmission and reception between them. FastEther is the collective name of network standards having a data transfer capability of 100 Mbps among those of Ethernet (registered trademark). SPAN T1 has a data transfer capability of 1.5 Mbps per line between a BS and a data collection apparatus (CR) disposed between the BS and a BSC. SPAN T1×3 means that three lines are provided each having a data transfer capability of 1.5 Mbps, so that a data transfer capability of about 4.5 Mbps is provided. The T1 line was taken as an example, but an E1 line has a data transfer capability of 2.0 Mbps, so that SPAN E1×3 provides a data transfer capability of about 6.0 Mbps.

Figure 4:
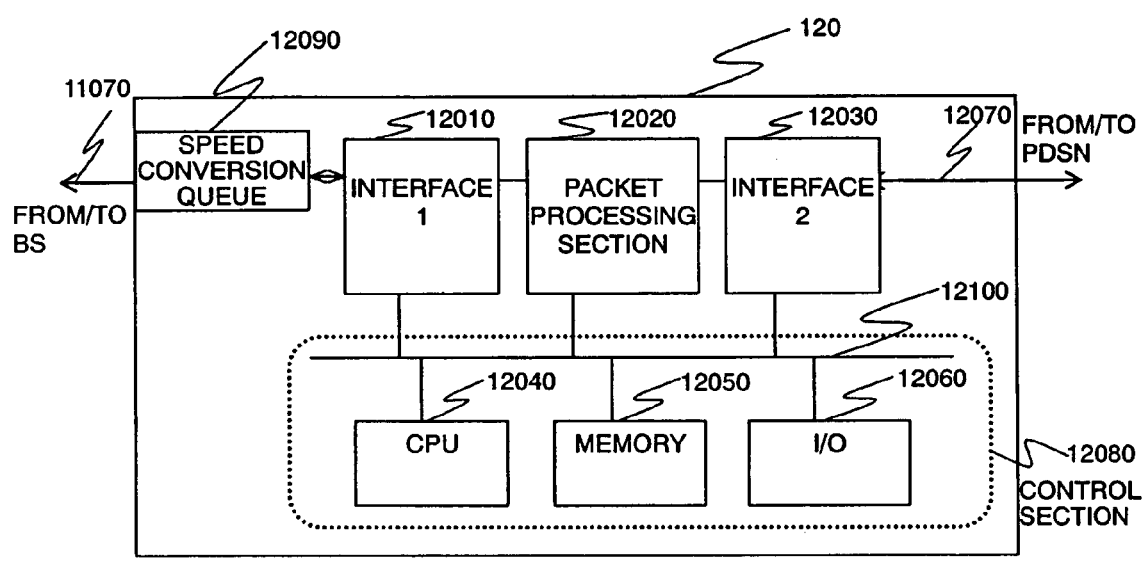
FIG. 4 is a view showing the hardware structure of a base-station controller (BSC).

FIG. 4 is a block diagram showing an example structure of the BSC 120.

The BS 120 includes, for example, an interface 12010 with the BSC 110, an interface 12030 with the PSTN 130 and the GW 160, a packet processing section 12020 for applying signal processing such as switching to signals transmitted and received between the interfaces, a control section 12080 for controlling the whole of the BSC 120, and a speed conversion queue 12090. The control section 12080 includes a CPU 12040 serving as a processor for controlling the operations of the whole of the BSC 120, a memory 12050 for storing an operation program and various data items necessary for the operations, and an I/O module 12060 for sending and receiving signals to and from an external unit. A control bus 12100 connects the above-described sections.

The speed conversion queue 12090 buffers data for transmission and reception because the BS 110 and the BSC 120 have the difference in speed (for example, a speed difference between FastEther and SPAN T1×3) for packet transmission and reception between them.

Figure 5:
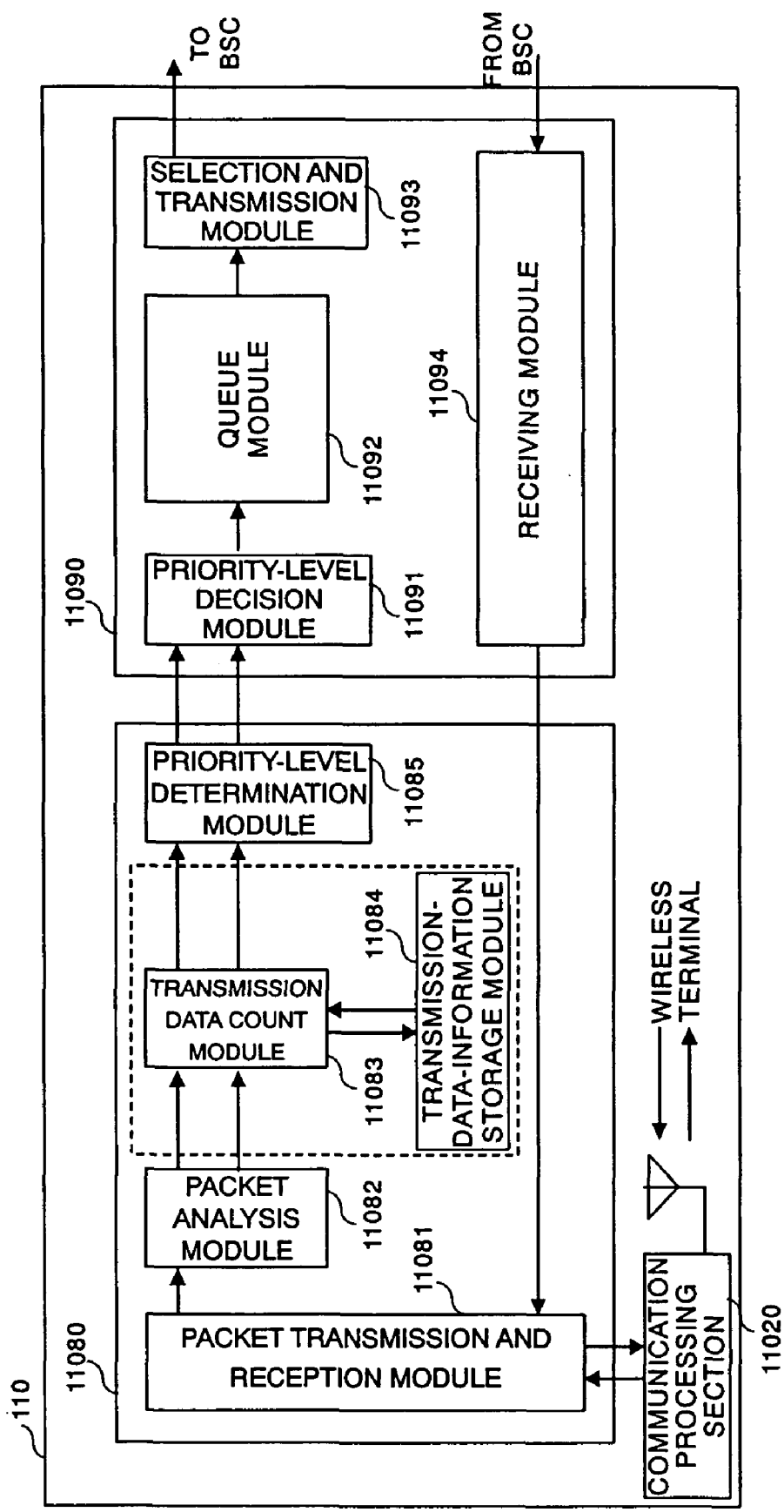
FIG. 5 is a view showing the software-function structure of the BS.

FIG. 5 is a functional view showing an example software configuration of the BS 110.

As described above, the BS 110 includes the control section 11080, which receives packets from a radio block and analyzes the packets, and the speed conversion queue 11090, which transmits and receives packets to and from the BSC while performing speed conversion.

The control section 11080 includes a packet transmission and reception module 11081 for transmitting and receiving packets to and from the communication processing section 11020, a packet analysis module 11082 for receiving packets from the packet transmission and reception module 11081 and for analyzing the packets, a transmission data count module 11083 for receiving the packets and packet analysis information from the packet analysis module 11082 and for measuring a packet passing-through amount for each user, a transmission-data-information storage module 11084 for receiving the packet passing-through amount from the transmission data count module 11083 and for storing the information for each user terminal, and a priority-level determination module 11085 for receiving the packets, the packet analysis information, and priority-level information (information indicating priority or non-priority) from the transmission data count module 11083 and for determining the priority level (queuing destination) of each packet. The packet analysis information includes, for example, the terminal number of the data transmission source, the QoS type of the data, and the data size.

The transmission data count module 11083 counts, for example, the number of bytes included in a packet as the packet passing-through amount. The number of packets or an appropriate data amount may be counted, instead of the number of bytes.

The transmission-data-information storage module 11084 stores, for example, the total number of bytes transmitted by a terminal in association with the number of the terminal. The terminal number in the present embodiment may be an appropriate identifier for identifying the terminal. The transmission-data-information storage module 11084 may store the number of packets or another information, instead of the number of bytes.

The speed conversion queue 11090 includes a priority-level decision module 11091 for receiving a packet and the priority level from the control section 11080 and for queuing the packet according to the priority level, a queue module 11092 having a queue prepared for each priority level, a selection and transmission module 11093 for determining a queue from which a packet is to be taken out, according to the state of the queues in the queue module 11092 and for sending the packet to the BSC 120, and a receiving module 11094 for receiving a packet from the BSC 120 and for sending the packet to the packet transmission and reception module 11081.

Any existing BS 110 does not include the transmission data count module 11083 or the transmission-data-information storage module 11084. In the existing BS 110, its priority-level determination module 11085 receives a packet and packet analysis information directly from its packet analysis module 11082 and determines the priority level of the packet.

Figure 14A:
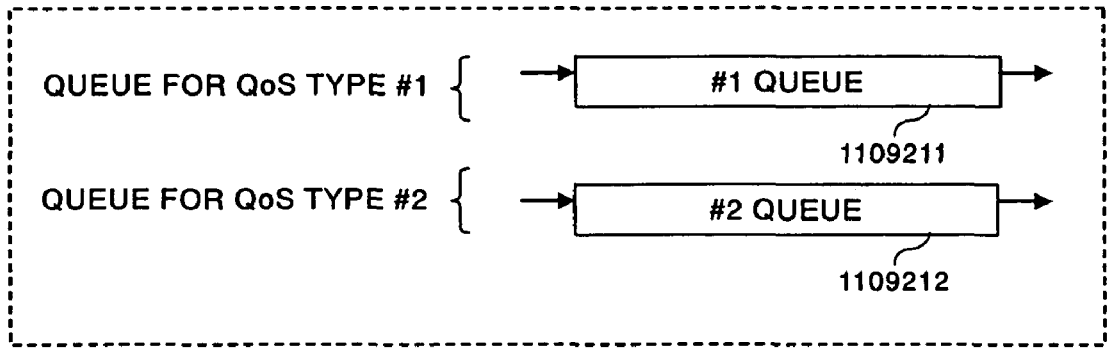
FIGS. 14A and 14B are views showing queues in a BS in the existing system and in the BS in the radio communication system according to the embodiment.
Figure 14B:
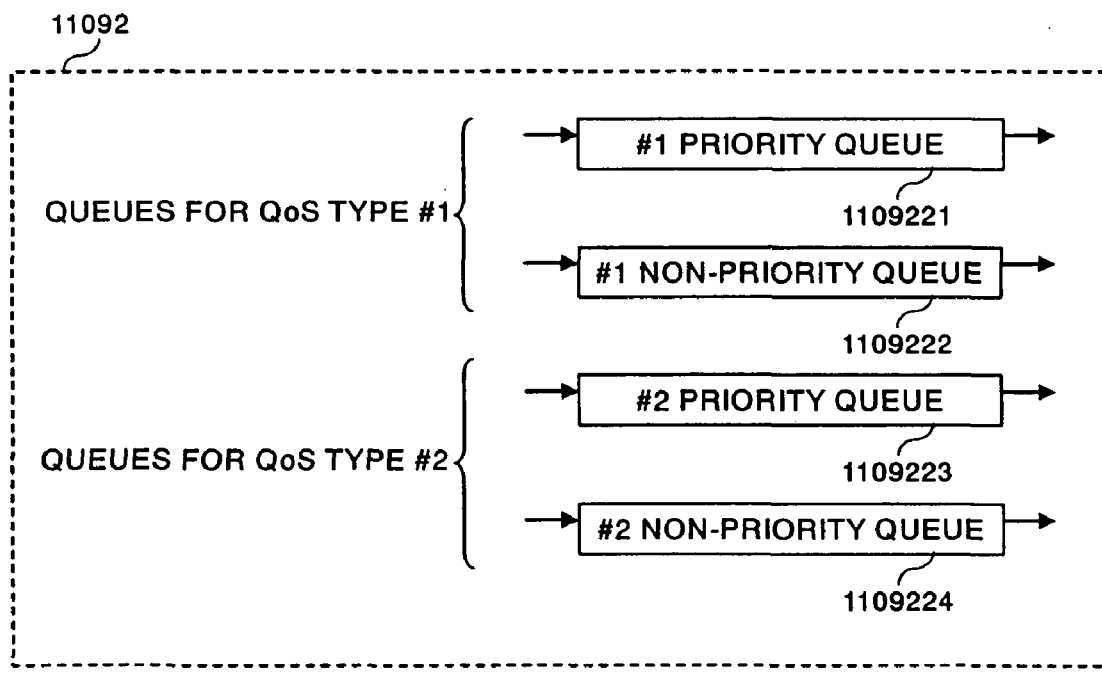

FIG. 14A is a functional view of queues used in an existing communication system and FIG. 14B is a functional view of the queues of the queue module 11092 shown in FIG. 5, in the present embodiment. In the existing system, for example, a queue is provided for each QoS type. In FIG. 14A, there are two QoS types as an example case, and a #1 queue 1109211 is provided for a QoS type #1 and a #2 queue 1109212 is provided for a QoS type #2.

In FIG. 14B, a #1 priority queue 1109221 and a #1 non-priority queue 1109222 are provided for a QoS type #1, and a #2 priority queue 1109223 and a #2 non-priority queue 1109224 are provided for a QoS type #2. The two QoS types are shown in the figure, but the number of QoS types may be three or more, or just one.

Figure 6:
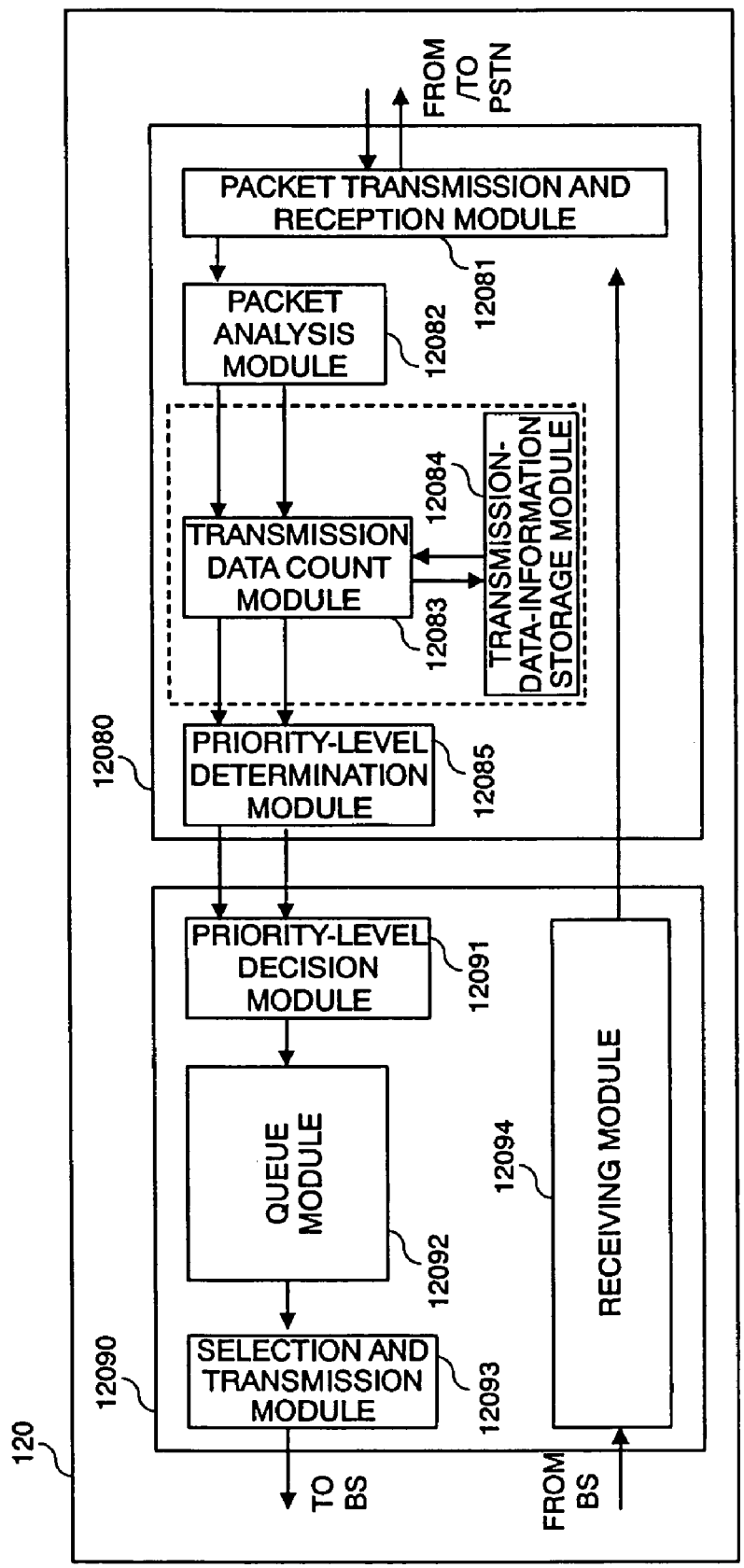
FIG. 6 is a view showing the software-function structure of the BSC.

FIG. 6 is a functional view showing an example software configuration of the BSC 120. As described above, the BSC 120 includes the control section 12080, which receives packets from the PSTN 130 and analyzes the packets, and the speed conversion queue 12090, which transmits and receives packets to and from the BS 110 while performing speed conversion.

The control section 12080 includes a packet transmission and reception module 12081 for transmitting and receiving packets to and from the packet processing section 12020, a packet analysis module 12082 for receiving packets from the packet transmission and reception module 12081 and for analyzing the packets, a transmission data count module 12083 for receiving the packets and packet analysis information from the packet analysis module 12082 and for measuring a packet passing-through amount for each user, a transmission-data-information storage module 12084 for receiving the packet passing-through amount from the transmission data count module 12083 and for storing the information for each user terminal, and a priority-level determination module 12085 for receiving the packets, the packet analysis information, and priority-level information (information indicating priority or non-priority) from the transmission data count module 12083 and for determining the priority level (queuing destination) of each packet according to the QoS type and the priority-level information.

The speed conversion queue 12090 includes a priority-level decision module 12091 for receiving a packet and the priority level from the control section 12080 and for queuing the packet at a queuing destination, a queue module 12092 having a priority queue and a non-priority queue prepared for each priority level, a selection and transmission module 12093 for determining a queue from which a packet is to be taken out, according to the states of the priority and non-priority queues in the queue module 12092 and for sending the packet to the BS 110, and a receiving module 12094 for receiving a packet from the BS 110 and for sending the packet to the packet transmission and reception module 12081.

Any existing BSC 120 does not include the transmission data count module 12083 or the transmission-data-information storage module 12084. In the existing BSC 120, its priority-level determination module 12085 receives a packet and packet analysis information directly from its packet analysis module 12082 and determines the priority level of the packet.

Figure 15A:
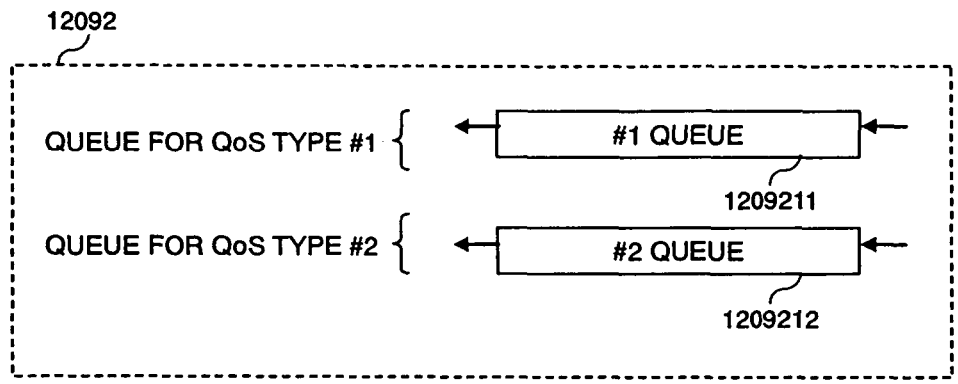
FIGS. 15A and 15B are views showing queues in a BSC in the existing system and in the BSC in the radio communication system according to the embodiment.
Figure 15B:
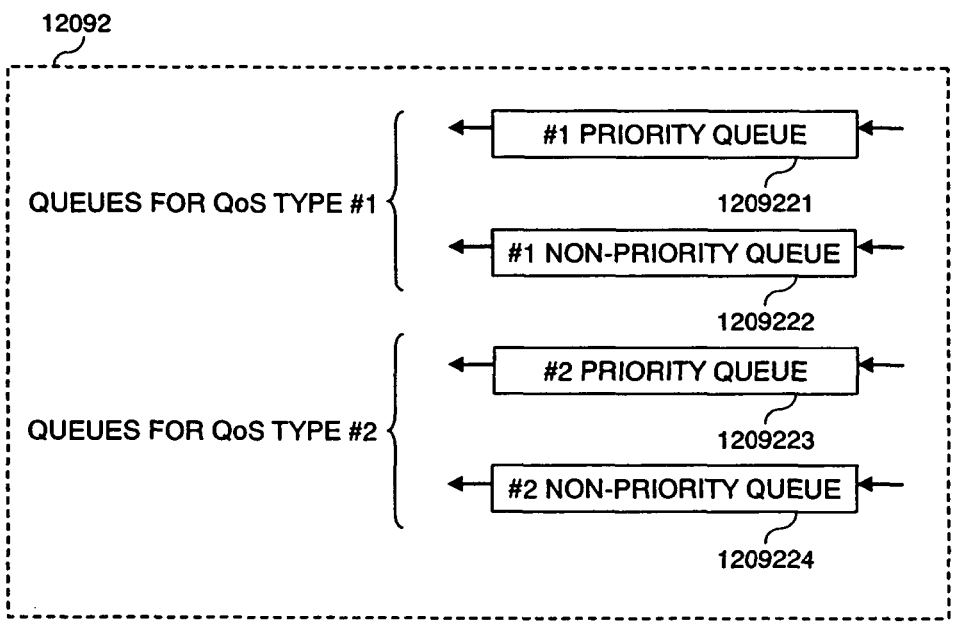

FIG. 15A is a functional view of queues used in the existing system and FIG. 15B is a functional view of the queues of the queue module 12092 shown in FIG. 6, in the present embodiment. In the existing system, for example, a queue is provided for each QoS type. In FIG. 15A, there are two QoS types as an example case, and a #1 queue 1209211 is provided for a QoS type #1 and a #2 queue 1209212 is provided for a QoS type #2.

In FIG. 15B, a #1 priority queue 1209221 and a #1 non-priority queue 1209222 are provided for a QoS type #1, and a #2 priority queue 1209223 and a #2 non-priority queue 1209224 are provided for a QoS type #2. The two QoS types are shown in the figure, but the number of QoS types may be three or more, or just one.

Operations

Processing in the existing system will be briefly described first. The following description of the existing system is for the understanding of the present embodiment, and is not intended to specify any conventional art.

Figure 8:
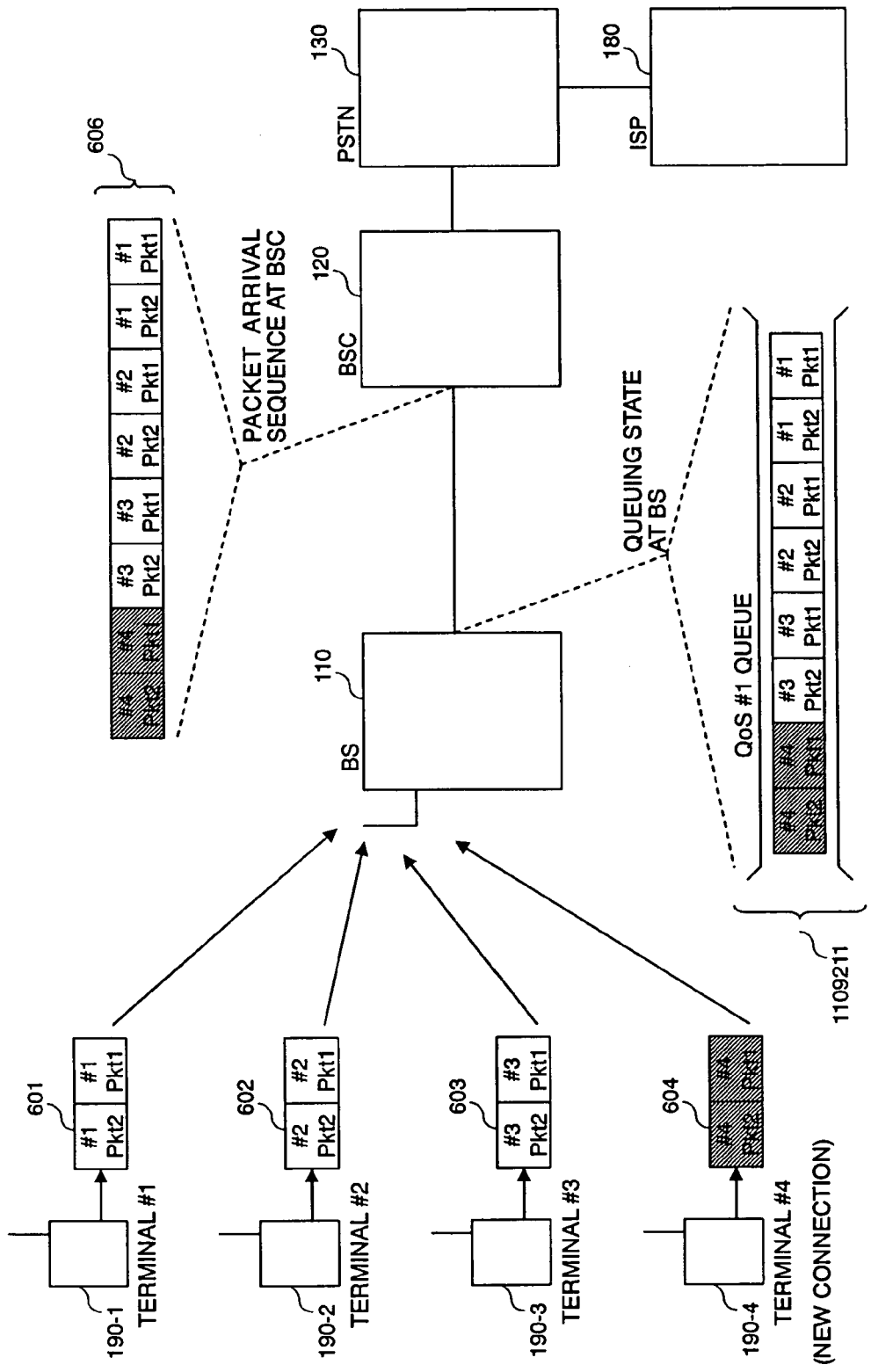
FIG. 8 shows example packet flows in an existing communication system having a user who wants to make a new connection and users who are in communication.

FIG. 8 is a view showing packet transmission made by users in communication and a user who wants to make a new connection, in the existing system. Terminals #1 to #3 indicate terminals 190-1 to 190-3 which have already been in communication, and a terminal #4 is a terminal 190-4 attempting to make a new connection. When the terminals #1 to #4 send packets 601 to 604, respectively, in that order to the BS 110, these packets are queued in that order in one queue 1109211. It is assumed here that the packets sent from the terminals #1 to #4 are of a QoS type #1. The queue 1109211 is a QoS #1 queue. Since the BS 110 handles all packets with equal opportunities, the terminal #4, which wants to make a new connection, is not handled with priority, and the packets in the queue 1109211 are dequeued in the order they were queued there and sent to the BSC 120. Therefore, the packets 604 sent from the terminal #4 arrive with a delay corresponding to the packets sent from the users already in communication, and it takes time to complete the connection.

Figure 9:
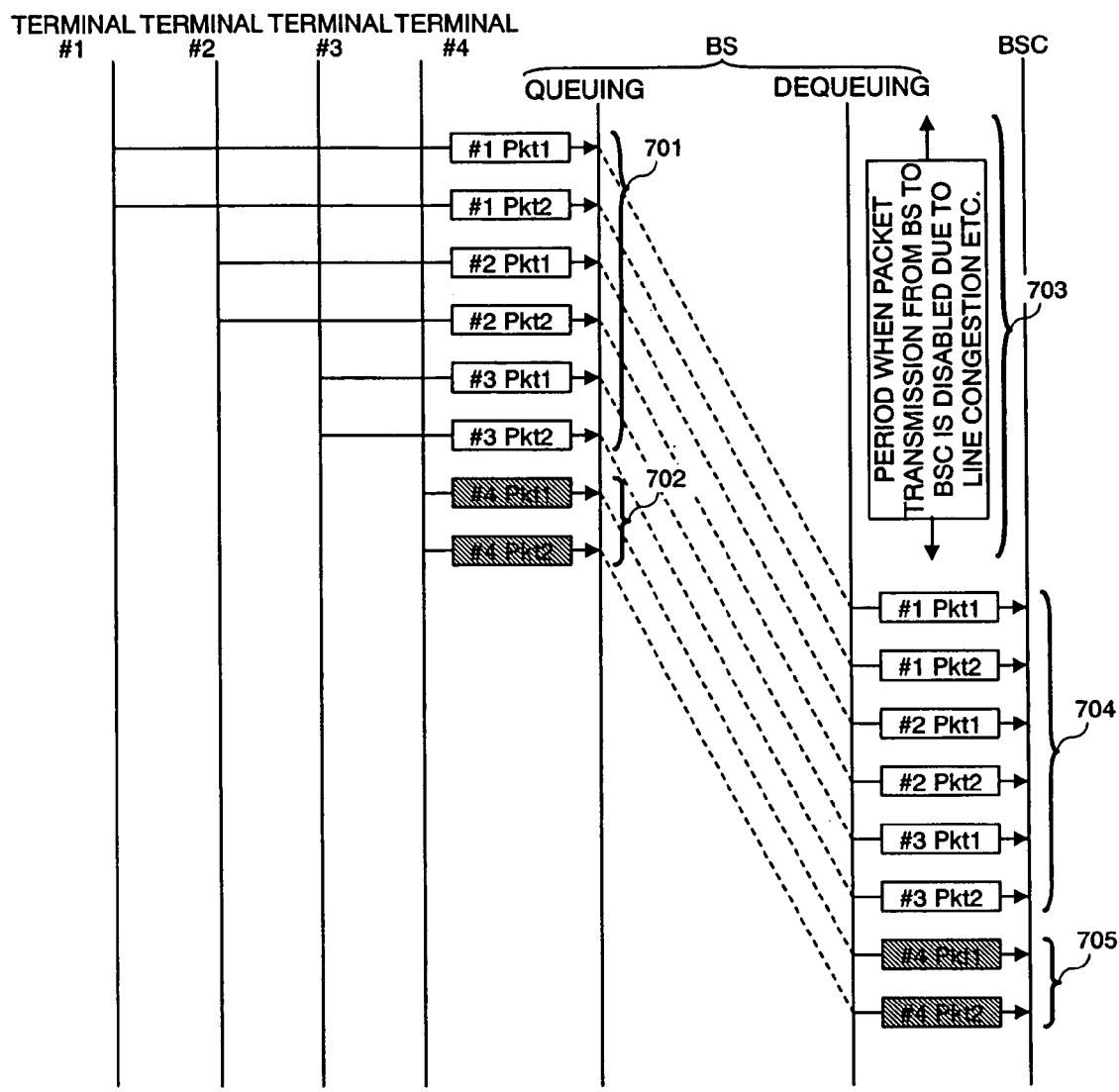
FIG. 9 shows a sequence in the existing system.

FIG. 9 is a view showing a sequence of processing which is problematic in the existing wireless communication system shown in FIG. 8. As in FIG. 8, the terminals #1 to #3 have already been in communication, and the terminal #4 attempts to make a new connection. It is assumed, for example, that the packets sent from the terminals #1 to #3 are queued first as shown by numeral 701, and the packets sent from the terminal #4 are queued last as shown by numeral 702. When transmission is disabled for a period as shown by numeral 703 due to line congestion between the BS and BSC, transmission is not performed and the packets remain at the queue until the congestion is eliminated. When the period, when transmission was disabled, ends, the packets are dequeued from the queue and sent to the BSC 120 in that order. The packets of the terminals #1 to #3 are first dequeued and sent as shown by numeral 704, and then the packets of the terminal #4 is dequeued and sent. Therefore, the terminal #4 needs a long time to make a connection due to a waiting time for packet processing in the queue. In the current case, only the three terminals have already been in communication. The more the number of terminals which have already been in communication is, the longer the time required for a new terminal to make a connection.

Figure 10:
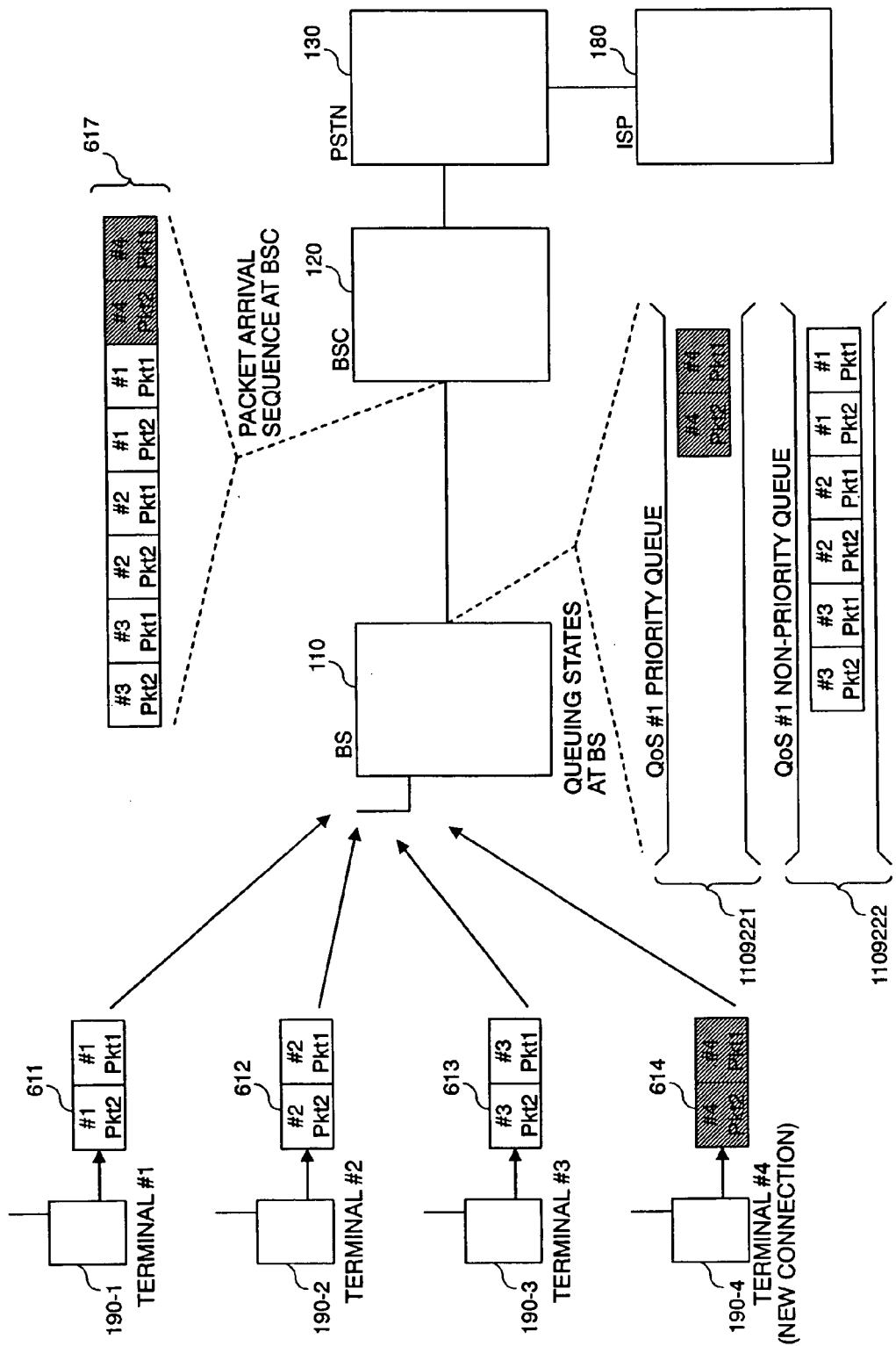
FIG. 10 shows packet flows in the radio communication system according to the embodiment, which is provided with a two-channel queue structure and has a user who wants to make a new connection and users who are in communication.

FIG. 10 is a view showing example packet transmission made by users in communication and a user who wants to make a connection, in the present embodiment. When terminals #1 to #4 send packets 611 to 614, respectively, in that order to the BS 110, the packets sent from the terminals #1 to #3, which have already made connections, are queued in a non-priority queue 1109222, and the packets sent from the terminal #4, which wants to make a new connection, is queued in a priority queue 1109221. Since the priority queue 1109221 has priority, the packets from the terminal #4 is dequeued first and sent to the BSC 120, and then, the packets from the terminals #1 to #3 in the non-priority queue are dequeued and sent to the BSC 120. As a result, the BSC receives the packets sent from the terminal #4, which wants to make a connection, first as indicated by numeral 617 in the figure, and the terminal #4 needs to have a shorter time to establish the connection than in a conventional case.

Figure 11:
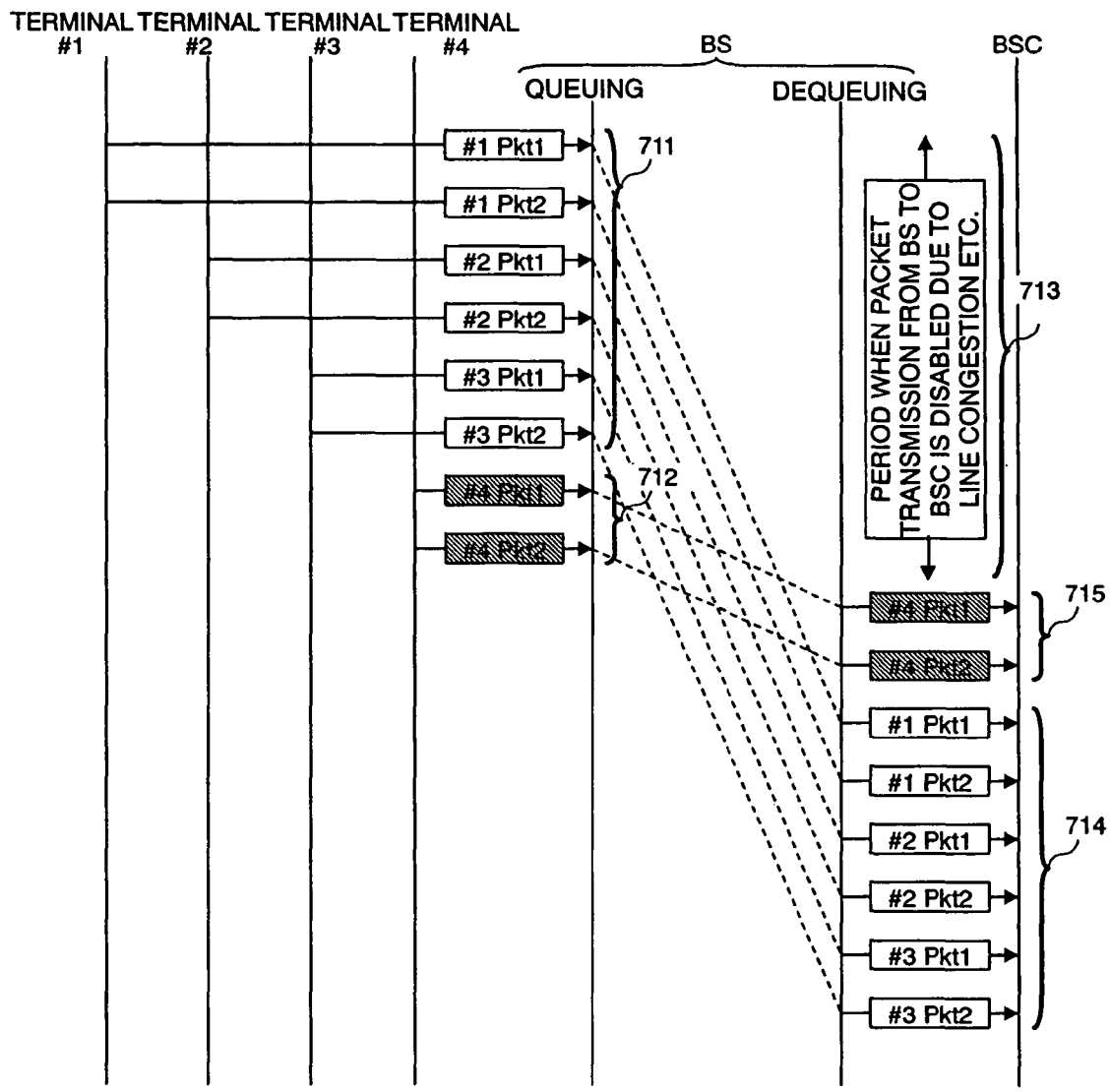
FIG. 11 shows a sequence in the radio communication system according to the embodiment.

FIG. 11 is a view showing a sequence of processing performed in the case shown in FIG. 10 in the present embodiment. As shown in FIG. 10, the packets sent from the terminals #1 to #3 are queued first as indicated by numeral 711, and the packets sent from the terminal #4 are queued last as indicated by numeral 712, in the order in which the packets are received, but in the different queues. When a period for which transmission is disabled as indicated by numeral 713 due to line congestion between the BS and BSC ends, the packets sent from the terminal #4, which wants to make a connection, are dequeued first and sent as indicated by numeral 715. Then, the packets sent the terminals #1 to #3, which have already made connections, are dequeued and sent as indicated by numeral 714. Therefore, the terminal #4 needs a short time to establish a connection irrespective of the number of terminals which have already made connections.

Data exchanged between the BS 110 and the BSC 120 can be broadly divided into two types, a data flow (hereinafter called upstream transmission) from the terminal 190 to the ISP 180 through the BS 110 and the BSC 120, and a data flow (hereinafter called downstream transmission) from the ISP 180 to the terminal 190 through the BSC 120 and the BS 110. In the following description, upstream transmission is taken as an example and the operation of the BS 110, which serves as a transmission source of upstream data, will be explained. It is assumed in the description that the terminals 190-1, 190-2, and 190-3 completed initial connection processing, have performed usual data communication for a sufficiently long period, and their packet transmission amounts are sufficiently large. It is also assumed that the terminal 190-4 has just started an initial connection. In the description, the terminals 190-1 to 190-4 all have an identical QoS type #1, but they may have a plurality of QoS types.

Figure 16:
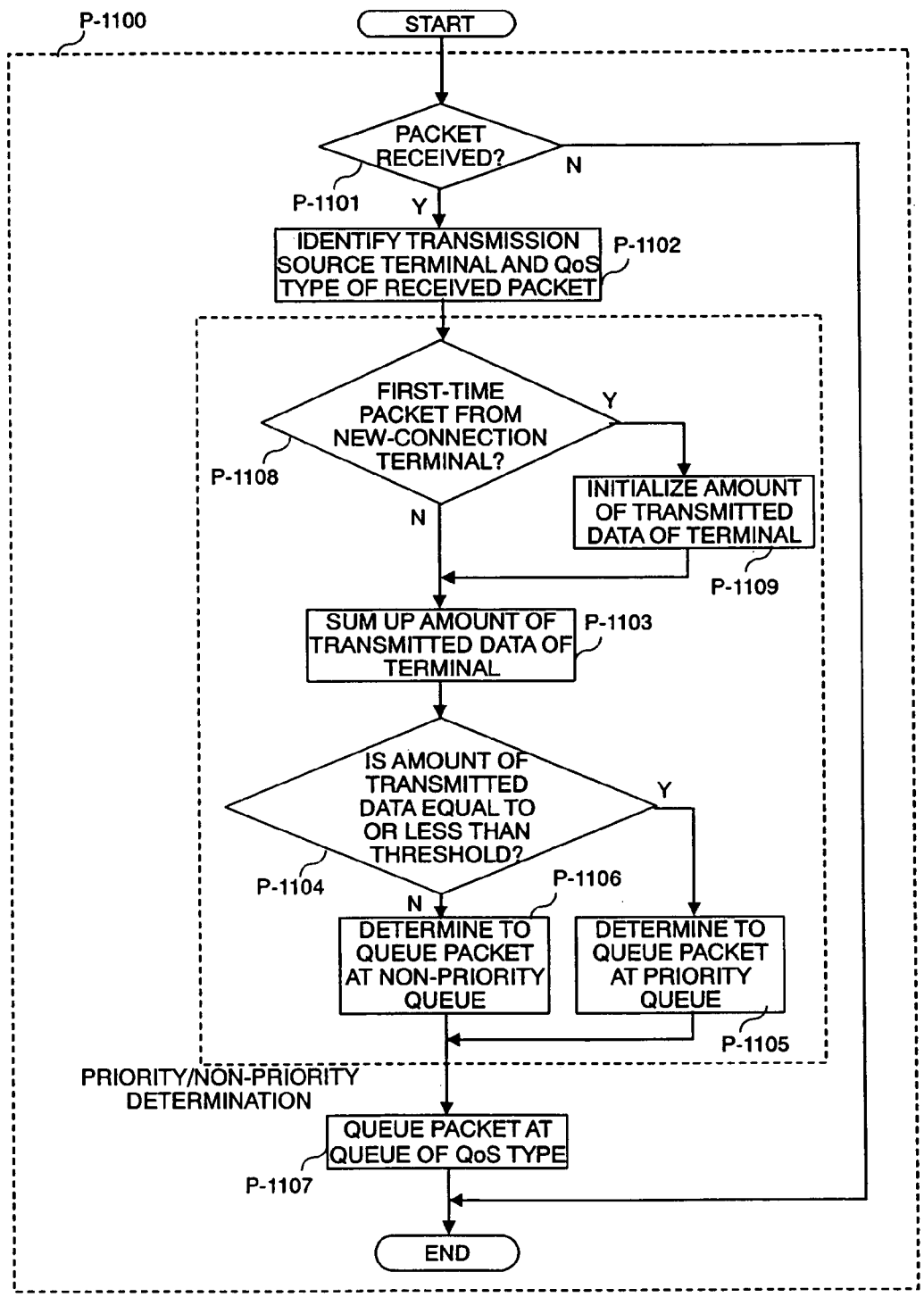
FIG. 16 is a detailed operation flowchart of upstream data determination and queuing processing P-1100.
Figure 17:
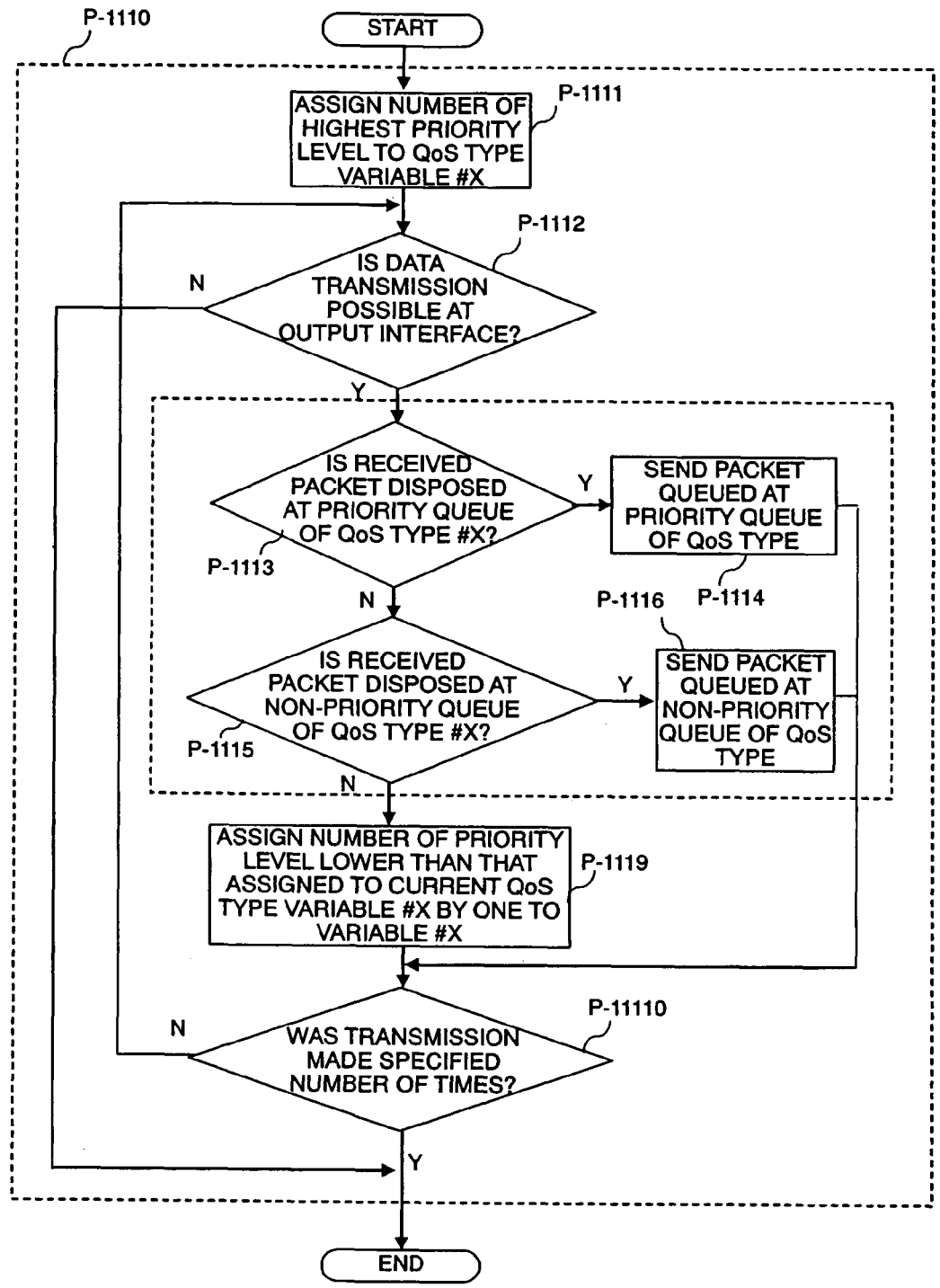
FIG. 17 is a detailed operation flowchart of upstream data transmission processing P-1110.
Figure 18:
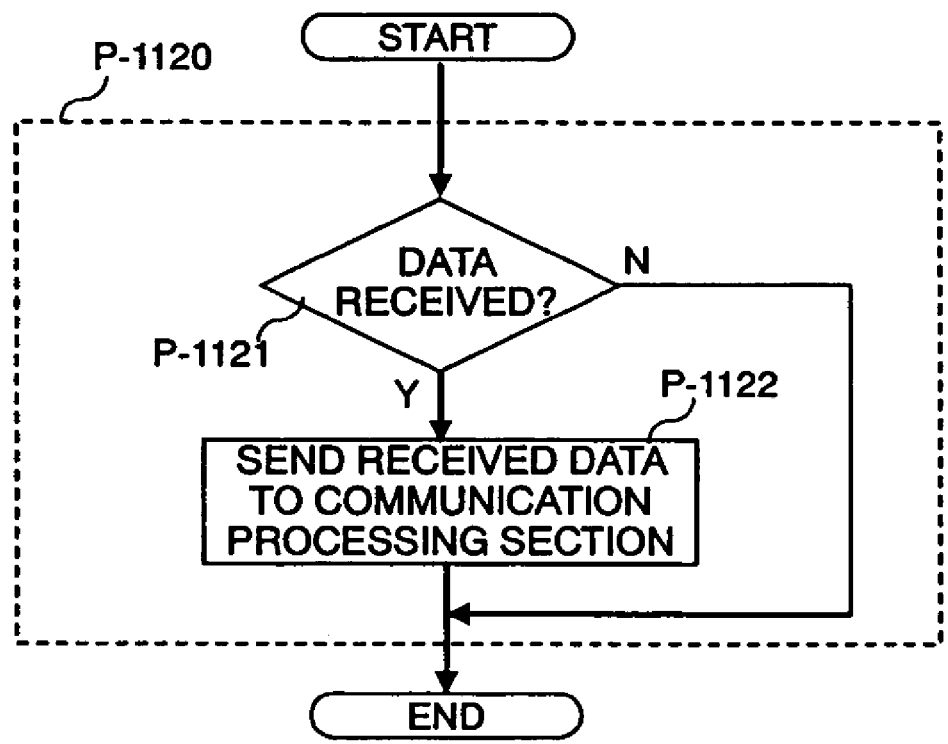
FIG. 18 is a detailed operation flowchart of downstream data processing P-1120.

FIG. 7 and FIGS. 16 to 18 are flowcharts showing example operations of the BS 110. The operations include, for example, upstream data determination and queuing processing P-1100, upstream data transmission processing P-1110, and downstream data processing P-1120. The upstream processing and the downstream processing can be performed in parallel. FIG. 16 is a detailed operation flowchart of the processing P-1100. FIG. 17 is a detailed operation flowchart of the processing P-1110. FIG. 18 is a detailed operation flowchart of the processing P-1120. The operations of the BSC are the same as those shown in FIG. 7 and FIGS. 16 to 18 except that the upstream processing and the downstream processing are exchanged.

First, an example operation in the existing system will be described. To facilitate the understanding of the present embodiment, the following operations will be described with a structure suited to the present embodiment being used. Neither the structure nor the operations identify any conventional art.

(1) The terminal 190-1 sends data generated in its control section to the BS 110 through its communication control section and RF section.

(2) The BS 110 receives the data from the terminal 190-1 and sends it to its control section through its RF section and communication processing section.

(3) The packet transmission and reception module in the BS 110 monitors the arrival of a packet, and the packet analysis module analyzes the contents of a received packet and generates packet analysis information that includes the terminal number of the data transmission source, the QoS type of the data, and the data size.

(4) The existing system does not include the transmission data count module or the transmission-data-information storage module. The numbers of transmission bytes are not summed up. Therefore, the packet analysis information, generated by the packet analysis module, and the data are directly sent to the priority-level determination module.

(5) The priority-level determination module determines a queuing destination of the data according to the QoS type (assuming a type #1 as an example) of the packet analysis information and sends the queuing destination and the data to the speed conversion queue. The priority-level decision module of the speed conversion queue selects the queue according to the determined queuing destination, and queues the data at a #1 queue in the queue module.

(6) The above-described processes (1) to (5) are also applied to the terminals 190-2 and 190-3, and their packets are queued at the #1 queue in the queue module.

(7) The terminal 190-4 generates packets used for an initial connection. The packets are also queued at the #1 queue in the queue module through the processes (1) to (5), described above.

(8) With the series of processes, all data sent from the terminals 190-1 to 190-4 is queued at the single #1 queue. In this example, since the packets from the terminal 190-4 arrive later than the packets from the other terminals, as indicated by numerals 702 and 701 in FIG. 9, the data of the terminal 190-4 is disposed at the end of the #1 queue 1109211 in the queue module.

(9) The selection and transmission module monitors the state of the queue and sends the data to the BSC 120. The selection and transmission module starts monitoring from the vacant state of a queue having the highest-priority-level QoS type.

(10) The selection and transmission module determines whether data transmission is possible through the line connecting the BS 110 and the BSC 120. If data transmission is impossible, the selection and transmission module does not perform queuing or transmission processing, but waits for the next upstream-data transmission processing to be called, as indicated by numeral 703 in FIG. 9.

(11) When data transmission is possible through the line connecting the BS 110 and the BSC 120, the selection and transmission module determines whether data is disposed at the queue having the QoS type. When data is disposed at the queue, the selection and transmission module sends the data to the BSC 120. Since all the packets sent from the terminals 190-1 to 190-4 are queued at the #1 queue in the current case, the packets are dequeued in the order in which they were queued. Therefore, the packets arrive at the BSC 120 in the same order as the order in which the packets were queued, as indicated by numeral 606 in FIG. 8. As a result, the packets from the terminal 190-4 arrive at the BSC 120, as indicated by numeral 705 in FIG. 9, later than the other packets, as indicated by numeral 704 in FIG. 9. The larger the amount of packets disposed at the queue is, the later the packets from the terminal 190-4 reach. This becomes especially significant when many terminals are used or when the amount of transmission data per terminal is large.

(12) When data is not disposed at the queue of the QoS type, the selection and transmission module applies the processes of (10) and (11) to a queue of a QoS type having a lower priority level by one. When packets are transmitted the specified number of times, packet transmission is stopped and the selection and transmission module waits for the next upstream-data transmission processing to be called.

Next, the operation of the data queuing processing P-1100 in the system of the present embodiment will be described with reference mainly to FIG. 16.

(13) The terminal 190-1 sends data generated by the control section 19080 or data input from the peripheral-device section 19030, to the BS 110 by radio through the communication processing section 19020 and the RF section 19010.

(14) The BS 110 receives the data from the terminal 190-1, and sends it to the control section 11080 through the RF section 11010 and communication processing section 11020.

(15) The packet transmission and reception module 11081 of the control section 11080 monitors the arrival of a packet in step P-1101 in FIG. 16. The packet analysis module 11082 analyzes the contents of a received packet and generates packet analysis information that includes the terminal number of the data transmission source, the QoS type (#1, for example) of the data, and the data size, in step P-1102 in FIG. 16. The packet analysis module 11082 extracts these data items, for example, from the packet header. The packet analysis module 11082 also outputs the packet analysis information and the data to the transmission data count module 11083.

(16) The system in the present embodiment is provided with the transmission data count module 11083 and the transmission-data-information storage module 11084. The transmission data count module 11083 receives the data and the packet analysis information from the packet analysis module 11082.

(17) The transmission data count module 11083 determines according to the packet analysis information whether the packet is the first-time packet sent from a terminal which wants to make a new connection, in step P-1108 in FIG. 16. The determination of the first-time packet will be described later in detail. If the packet is not the first-time packet, the processing proceeds to step P-1103. In the current case, since the terminal 190-1 has already established a connection, the processing proceeds to step P-1103.

(18) The transmission data count module 11083 determines the data size (such as the number of bytes) according to the packet analysis information, and adds the data size in a corresponding terminal area in the transmission-data-information storage module 11084 as the amount to transmitted data in step P-1103 in FIG. 16. For example, the terminal number and the data size are extracted from the received packet analysis information, and the extracted data size is added in an area corresponding to the terminal number in the transmission-data-information storage module 11084 to store the total data size. The amount of data counted is the number of bytes in a packet in the current case, but may be the number of packets or an elapsed time from the first-time packet.

(19) The transmission data count module 11083 determines in step P-1104 in FIG. 16 whether the amount of transmitted data of the terminal, stored in the transmission-data-information storage module 11084, exceeds a predetermined threshold. According to the result of determination, the packet is determined to be queued at a priority queue or at a non-priority queue (priority-level information is determined). In the current case, since it is assumed that the terminal 190-1 has sent packets sufficiently after connected, it is determined that the amount of transmitted data exceeds the threshold (No in step P-1104). Therefore, queuing the packet at the non-priority queue is determined in step P-1106. The priority-level information is set to "non-priority", for example.

(20) The priority-level determination module 11085 determines the queuing destination of the data according to the QoS type in the packet analysis information and the queuing destination (determination of "priority" or "non-priority", in the current case, "non-priority") determined by the transmission data count module 11083, and sends the data and the queuing destination to the speed conversion queue 11090. Since the QoS type of the terminal 190-1 is #1, and queuing at the non-priority queue is determined in the process (19), the queuing destination is determined to be the #1 non-priority queue 1109222. The identifier of a queue may be specified.

(21) The priority-level decision module 11091 of the speed conversion queue 11090 selects the queue according to the determination made by the priority-level determination module 11085 and queues the data in the queue module 11092. The packets sent from the terminal 190-1 are queued at the #1 non-priority queue 1109222 in step P-1107 in FIG. 16.

(22) The same processes as those from (13) to (21) are applied to the terminals 190-2 and 190-3, and the packets sent from the terminals 190-2 and 190-3 are queued at the #1 non-priority queue 1109222 in the queue module 11092.

(23) In the current case, it is assumed that the terminal 190-4 wants to make a new connection. The packet processing differs between the first-time packet in a new connection and packets sent subsequently.

(24) The same processes as those from (13) to (16) are applied to the first-time packet sent from the terminal 190-4, as to the packets sent from the terminal 190-1, and different processes are applied from the process (17).

(25) In the process (17) (in step P-1108), the transmission data count module 11083 determines that the packet is the first-time packet sent from a terminal which wants to make a new connection. The transmission data count module obtains an area for storing the amount of transmitted data of the terminal in the transmission-data-information storage module 11084, and initializes the amount of transmitted data, for example, to zero in step P-1109 in FIG. 16. Then, the processing proceeds to step P-1103. The area can be released when the connection to the terminal is disconnected.

(26) After the same process as the process (18) is performed in step P-1103, it is determined in the process (19) whether the amount of transmitted data exceeds the threshold in step P-1104. Since, at the first-time-packet transmission, only the size of that packet is stored as the amount of transmitted data, the amount of transmitted data is smaller than the threshold. Therefore, the transmission data count module 11083 determines queuing at the priority queue in step P-1105. The priority-level information is set to "priority", for example.

(27) The process (20) determines the queuing destination. Since the QoS type of the terminal 190-4 is #1, and queuing at the priority queue has been determined in the process of (26), the queuing destination is determined to be the #1 priority queue 1109221.

(28) In the same process as the process (21), the priority-level decision module 11091 queues the first-time packet from the terminal 190-4 at the #1 priority queue 1109221 in step P-1107.

(29) Processes to be applied to packets subsequent to the first-time packet of the terminal 190-4 are the same as the processes (24) to (28) except that step P-1109, where the transmission-data-information storage module is initialized, in the process (25) is not performed. The packets are queued at the #1 priority queue 1109221 in step P-1107.

(30) With the series of the above processes, the data sent from the terminals 190-1 to 190-3 is queued at the #1 non-priority queue 1109222, and the data sent from the terminal 190-4 is queued at the #1 priority queue 1109221. Therefore, irrespective of the amount of data in usual data communication of the terminals 190-1 to 190-3 and the number of terminals, the data sent from the terminal 190-4 is queued separately from the other data, as indicated by the queues 1109221 and 1109222.

The upstream data transmission processing P-1110 will be described next with reference, mainly, to FIG. 17. The data has been queued at the queues by the above-described processes.

(31) The selection and transmission module 11093 monitors the state of each queue and sends the data to the BSC 120. The selection and transmission module 11093 monitors from the vacant state of a queue having the highest-priority-level QoS type in step P-1111 in FIG. 17. For example, the selection and transmission module 11093 assigns the number of the highest priority level, such as #1, to a QoS type variable #x in step P-1111.

(32) The selection and transmission module 11093 determines in step P-1112 whether the line connecting the BS 110 and the BSC 120 can send data. If data transmission is impossible, as indicated by numeral 713 in FIG. 11, the selection and transmission module 11093 performs neither dequeuing nor transmission processing, but waits the next upstream data transmission processing to be called.

(33) When the line connecting the BS 110 and the BSC 120 can send data, the selection and transmission module 11093 first determines whether data (packet) is disposed at the priority queue of the QoS type corresponding to the assigned QoS type variable #x, in step P-1113. When data is disposed (YES in step P-1113), the selection and transmission module 11093 dequeues the data and sends it to the BSC 120 in step P-1114. If data is not disposed at the priority queue (NO in step P-1113), the selection and transmission module 11093 determines in step P-1115 whether data is disposed at the non-priority queue of the QoS type. When data is disposed there (YES in step P-1115), the selection and transmission module 11093 dequeues the data and sends it to the BSC 120 in step P-1116. In the present description, the packets sent from the terminal 190-4 are queued at the #1 priority queue, and the packets sent from the terminals 190-1 to 190-3 are queued at the #1 non-priority queue. Therefore, the packets from the terminal 190-4 are sent to the BSC first, as indicated by numeral 715 in FIG. 11, and then, the packets from the terminals 190-1 to 190-3 are sent to the BSC, as indicated by numeral 714. Consequently, the packets from the terminal 190-4 always reach the BSC 120 first irrespective of the amount of data of the other terminals and the number of terminals, as indicated by numeral 617 in FIG. 10.

Figure 19:
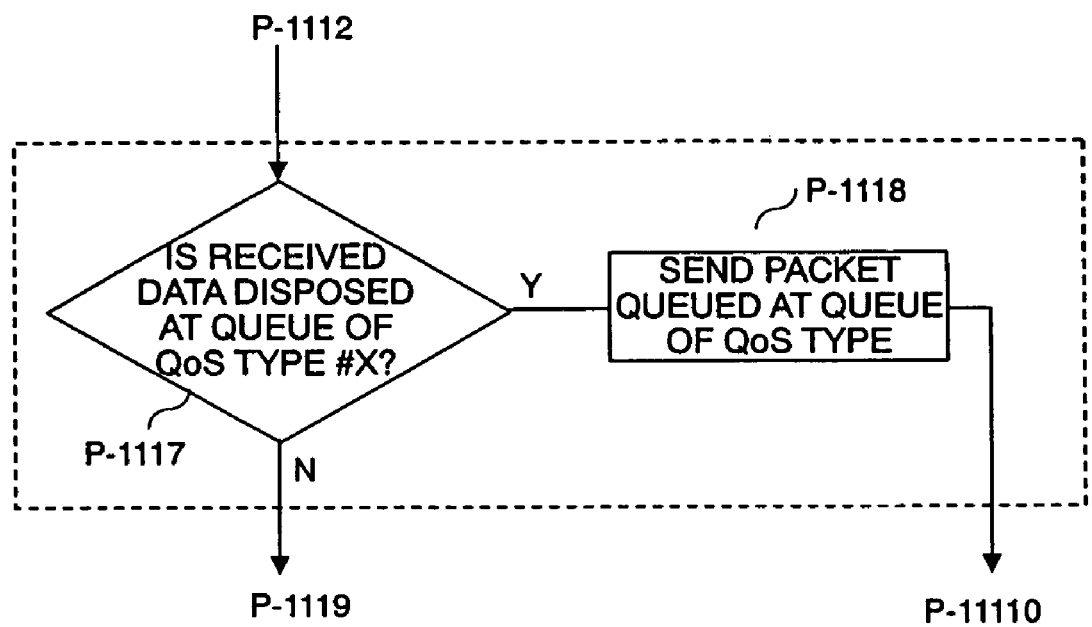
FIG. 19 is a flowchart of example dequeuing processing in the existing system.

FIG. 19 is a view showing a packet transmission operation in the existing system. In the existing system, the processes of the above-described steps P-1113 to P-1116 (enclosed by a dotted line in FIG. 17) correspond, for example, to processes shown in FIG. 19. After step P-1112, the selection and transmission module 11093 determines in step P-1117 whether received data is disposed at a queue of the QoS type #x. If received data is not disposed there (NO in step P-1117), the procedure proceeds to step P-1119. When received data is disposed there (YES in step P-1117), the selection and transmission module 11093 dequeues the packets disposed at the queue of the QoS type and sends them to the BSC 120 in step P-1118, and the procedure proceeds to step P-11110.

(34) Back to the description of the present embodiment, if data is not disposed at the queue of the QoS type (NO in step P-1115), the selection and transmission module 11093 assigns the QoS type (for example, #2) having a lower priority level by one to the QoS type variable #x in step P-1119 in FIG. 17.

(35) When packets are sent a specified number of times, the selection and transmission module 11093 stops packet transmission and waits for the next upstream data transmission processing to be called. If packets are not sent the specified number of times, the processing returns to step P-1112 and the subsequent processes are repeated.

(36) When the above-described processes last for a certain period of time, and the amount of transmitted data of the terminal 190-4 increases, the determination in step P-1104 in FIG. 16 of whether the amount of transmitted data exceeds the threshold in the process (26) shows that the amount of transmitted data exceeds the threshold. Then, the terminal 190-4 is not regarded as a target serving as a terminal which wants to make a new connection, and packets sent from the terminal 190-4 are queued and sent in the same way as those from the other terminals. For example, the packets from the terminal 190-4 are queued according to the QoS.

In the above description, packets are queued at and dequeued from the QoS type #1 priority queue, the QoS type #1 non-priority queue, the QoS type #2 priority queue, and the QoS type #2 non-priority queue in that order. For example, packets can be queued at and dequeued from the QoS type #1 priority queue, the QoS type #2 priority queue, the QoS type #1 non-priority queue, and the QoS type #2 non-priority queue in that order.

The upstream processing of the BS 110 has been described. The downstream processing of the BSC 120 is the same.

FIG. 18 is a flowchart of the downstream data processing P-1120.

The receiving module 11094 determines in step P-1121 in FIG. 18 whether it has received data. When data is received, the receiving module 11094 sends the received data to the communication processing section 11020. The receiving module 11094 may send the received data through the packet transmission and reception module 11091 of the control section. If data is not received, the receiving module 11094 continues to determine whether it has received data.

Priority Determination

Figure 12A:
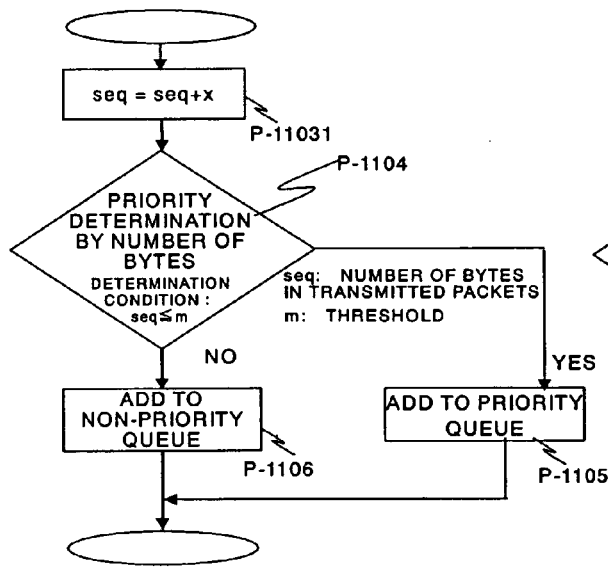
FIGS. 12A, 12B, and 12C are flowcharts of packet-priority-processing determination operations.
Figure 12B:
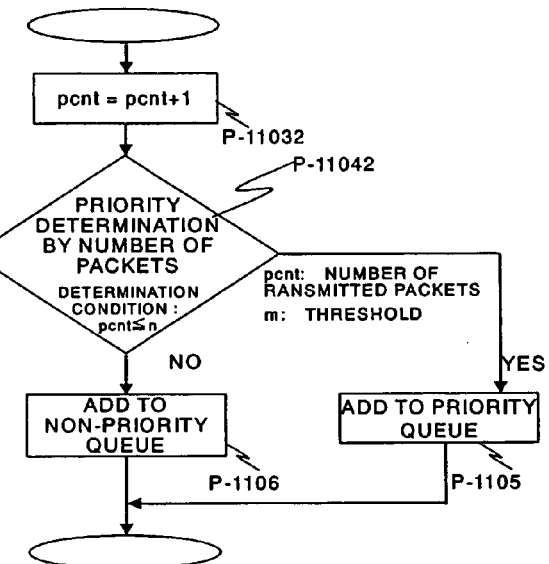
Figure 12C:
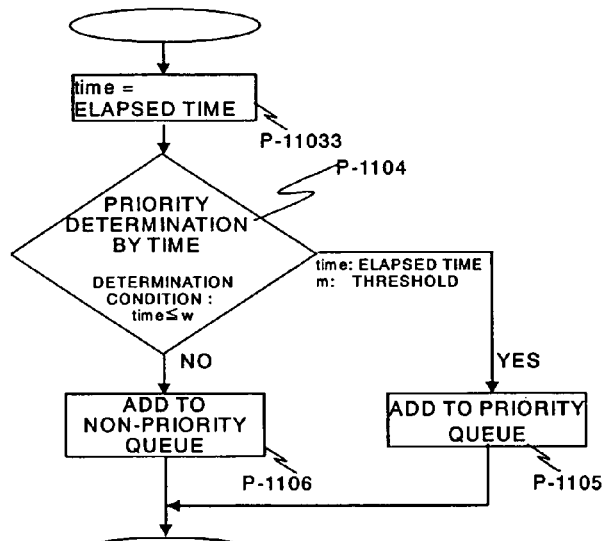

FIGS. 12A to 12C show specific processing methods used in the priority determination made in step P-1104 in FIG. 16. FIG. 12A shows a method in which the transmission data count module 11083 determines priority/non-priority according to the number of bytes. Packets of m bytes sent from a terminal which wants to make a new connection are processed with priority. The transmission data count module 11083 counts the number "x" of bytes in the received packet sent from a terminal and adds it to the number "seq" of bytes for the terminal in the transmission-data-information storage module 11084 in step P-11031. The transmission data count module 11083 performs priority determination in step P-11041. Actually, the transmission data count module 11083 determines whether the number "seq" of bytes for the terminal, stored in the transmission-data-information storage module 11084, is equal to or smaller than a predetermined threshold "m". Since processes performed in step P-1105 and step P-1106 are the same as those described with reference to FIG. 16, a description thereof is omitted here. In this method, when the number "seq" of bytes exceeds the predetermined threshold "m", subsequent packets are processed without priority.

FIG. 12B shows a method in which the transmission data count module 11083 determines priority/non-priority according to the number of packets. With priority, n packets sent from a terminal which wants to make a new connection are processed. When the transmission data count module 11083 receives a packet from a terminal, it increments the number "pcnt" of packets for the terminal in the transmission-data-information storage module 11084, for example, by one in step P-11032. The transmission data count module 11083 performs priority determination in step P-11042. Actually, the transmission data count module 11083 determines whether the number "pcnt" of packets for the terminal, stored in the transmission-data-information storage module 11084, is equal to or smaller than a predetermined threshold "n". Since processes performed in step P-1105 and step P-1106 are the same as those described with reference to FIG. 16, a description thereof is omitted here. In this method, when the number "pcnt" of packets exceeds the predetermined threshold "n", subsequent packets are processed without priority.

FIG. 12C shows a method in which the transmission data count module 11083 determines priority/non-priority according to the processing period of time. Packets sent from a terminal which wants to make a new connection are processed with priority for "w" seconds from the reception of the first-time packet. The transmission-data-information storage module (receiving-time storage module) 11084 stores, for example, the time when the first-time packet is received from a terminal which wants to make a new connection, for each terminal identifier. When the transmission data count module (elapsed-time calculation module) 11083 receives a packet and the packet analysis information, it calculates the elapsed time from when the first-time packet was received from the terminal to the current time according to the time corresponding to the packet identifier included in the packet analysis information and the current time with reference to the transmission-data-information storage module 11084, in step P-11033. The elapsed time may be obtained by another appropriate method. The transmission data count module 11083 determines whether the elapsed time is equal to or shorter than a predetermined threshold "w". Since processes performed in step P-1105 and step P-1106 are the same as those described with reference to FIG. 16, a description thereof is omitted here. In this method, when the elapsed time exceeds the predetermined threshold "w", subsequent packets are processed without priority.

At the priority determination described above, the transmission data count module 11083 may determine whether the number is smaller than a predetermined threshold.

First-time-packet Determination

Figure 13A:
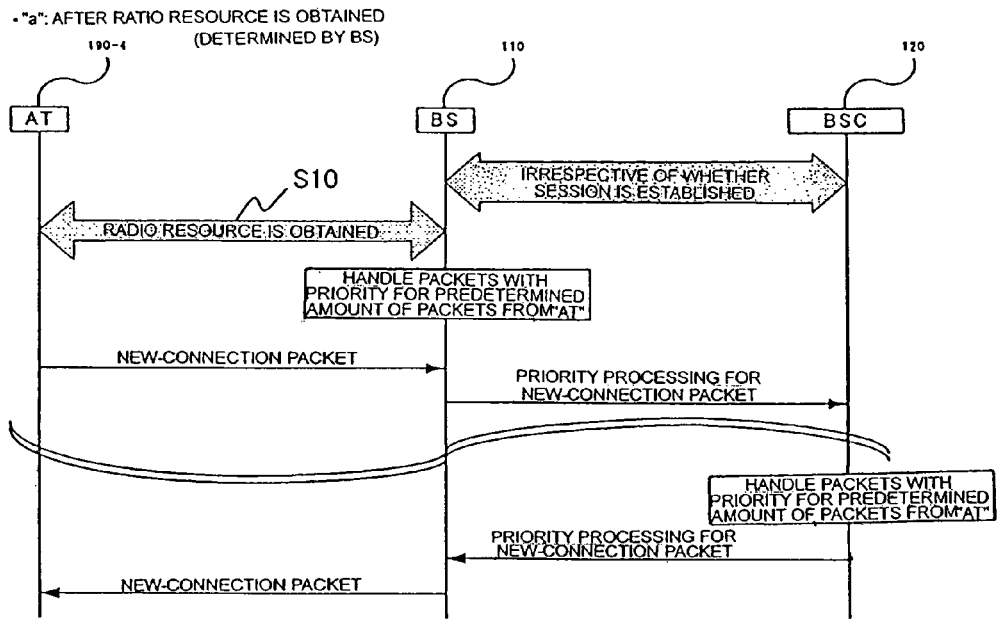
FIGS. 13A and 13B show sequences of packet-priority-processing determinations.
Figure 13B:
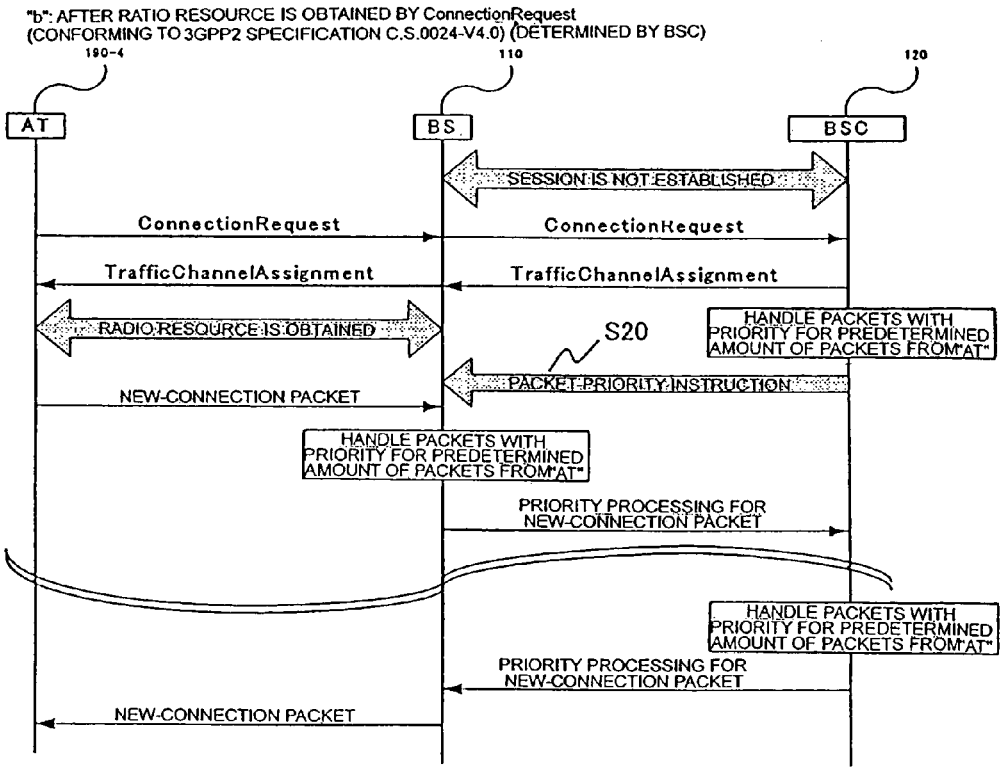

FIGS. 13A and 13B show when a new-connection packet (first-time packet) from a terminal is checked and how it is sent and received with priority. One of two methods shown in FIGS. 13A and 13B can be used.

A method "a" shown in FIG. 13A handles a predetermined amount of packets with priority after radio-resource acquisition. When a radio resource is obtained between the BS 110 and a terminal 190 which wants to make a new connection in step S10 irrespective of whether a session is established between the BS 110 and the BSC 120, packet priority processing starts. In this case, the BS 110 determines to start the packet priority processing.

A method "b" shown in FIG. 13B handles a predetermined amount of packets with priority when a terminal 190 which wants to make a new connection sends a ConnectionRequest (connection request; for details, see 3GPP2 Specification C.S.0024-V4.0) and a radio resource is established between the terminal 190 and the BS 110 while a session is not established between the BS 110 and the BSC 120. In this case, the BSC 120 receives the ConnectionRequest, determines to perform priority processing, and sends to the BS 110 in step S20 a priority-processing start signal (packet priority instruction). When the BS 110 receives this signal, it starts the priority processing.

More specifically, the following processes are performed in the methods.

A first-time flag is prepared for each terminal 190 in the BS 110.

When the radio resource is obtained in step S10 in FIG. 13A or when the packet priority instruction is issued in step S20 in FIG. 13B, the BS 110 sets on the first-time flag of the corresponding terminal.

When the BS 110 receives a packet from a terminal 190 even just once, the BS 110 sets off the first-time flag of the terminal.

When the BS 110 receives a packet from a terminal 190 while the corresponding first-time flag is on, the BS 110 regards the packet as the first packet in step P-1108 in FIG. 16. Then, the BS 110 initializes the amount of transmitted data for the terminal in step P-1109.

When the BS 110 receives a packet from a terminal 190 (AT) while the corresponding first-time flag is off, the BS 110 regards the packet as the second or subsequent packet in step P-1108, and the processing proceeds to step P-1103.

Figure 7:
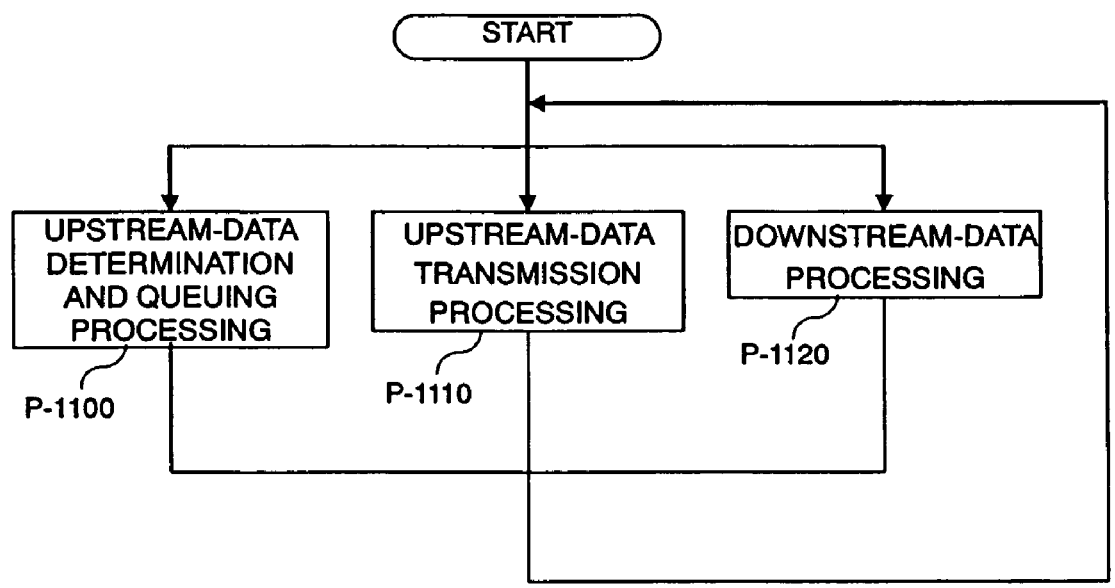
FIG. 7 is a flowchart of BS software.

Since processing flows in the BSC 120 are the same as those shown in FIG. 7 except that the upstream processing and the downstream processing are exchanged, the determination routine described above is also applied to the BSC 120.

The present invention, for example, can be applied to industries related to packet communication systems and communication services which handle a plurality of subscribers.

What is claimed is:

1. A base station comprising:
a radio-signal processing section for performing conversion between an electric signal and a radio signal received from and transmitted to a terminal through an antenna;
a communication processing section for applying predetermined communication processing to the electric signal from the radio-signal processing section;
a queue section for buffering a packet to a base station network and for sending the packet; and
a control section for sending with a priority a predetermined amount of packets to newly connect the terminal and the base station network,
wherein
the control section comprises:
the packet analysis module for receiving a packet from the communication processing section, for generating a packet analysis information that includes a terminal identifier of a transmission source by referring to the packet, and for outputting the received packet and the packet analysis information; and
a count module for receiving the packet analysis information from the packet analysis module, for obtaining, for each terminal an identifier included in the packet analysis information, the amount of data received when a first packet is received from the terminal at a current time, or an elapsed time from when the first packet is received from the terminal to a current time, for setting priority-level information to a priority in the case that the amount of data or the elapsed time is less than a predetermined threshold, and for setting the priority-level information to a non-priority in the case that the amount of data or the elapsed time is not less than the predetermined threshold, and
the queue section comprises:
a priority queue where a packet for which the priority-level information is the priority is queued;
a non-priority queue where a packet for which the priority-level information is the non-priority is queued;
a priority-level decision module for queuing the packet at one of the priority queue and the non-priority queue according to the priority-level information set by the count module; and
a selection and transmission module for, when the priority queue has a packet, dequeuing the packet from the priority queue and sending the packet to the base station network, and for, when the priority queue does not have a packet but the non-priority queue has a packet, dequeuing the packet from the non-priority queue and sending the packet to the base station network.

2. A base station according to claim 1,
wherein
the amount of data is the number of bytes in packets and the count module comprises:

a data-amount-information storage segment for storing, for each terminal identifier, the total number of bytes received when the first packet is received from the terminal to the current time, and a data-amount count segment for obtaining the number of bytes in the received packet and for adding the obtained number of bytes to the number of bytes corresponding to the terminal identifier included in the packet analysis information by referring to the data-amount storage segment.

3. The base station according to claim 1,
wherein
the amount of data is the number of packets; and
the count module comprises:

a data-amount-information storage segment for storing, for each terminal identifier, the total number of packets received when the first packet is received from the terminal to the current time, and a data-amount count segment for, when receiving a packet, increasing the number of packets corresponding to the terminal identifier included in the packet analysis information by referring to the data-amount storage segment.

4. A base station according to claim 1,
wherein the count module comprises:

a receiving-time storage segment for storing, for each terminal identifier, the time when the first packet is received from the terminal, and an elapsed-time calculation segment for, when receiving the packet analysis information, calculating according to the current time and the time corresponding to the terminal identifier included in the packet analysis information by referring to the receiving-time storage segment, an elapsed time from when the first packet is received from the terminal to the current time.

5. The base station according to claim 1,
wherein, when a radio resource is obtained between the terminal and the base station, or when a packet priority instruction for handling a packet of a specified terminal with priority is received from the base-station network, the control section sets on a first-time flag corresponding to the terminal, and when a packet is received from the terminal while the first-time flag is on, the control section initializes the amount of data or the elapsed time in the count module and sets off the first-time flag.

6. A base station comprising:
a radio-signal processing section for performing conversion between an electric signal and a radio signal received from and transmitted to a terminal through an antenna;
a communication processing section for applying predetermined communication processing to the electric signal from the radio-signal processing section;
a queue section for buffering a packet to a base station network and for sending the packet; and
a control section for sending with priority a predetermined amount of packets to newly connect the terminal and the base station network,
wherein
the control section comprises:
the packet analysis module for receiving a packet from the communication processing section, for generating a packet analysis information that includes a terminal identifier of a transmission source and a QoS type by referring to the packet, and for outputting the received packet and the packet analysis information; and a count module for receiving the packet analysis information from the packet analysis module, for obtaining, for each terminal identifier included in the packet analysis information, an amount of data received from when a first packet is received from the terminal at a current time, or an elapsed time from when a first packet is received from the terminal at a current time, for setting priority-level information to a priority in the case that the amount of data or the elapsed time is less than a predetermined threshold, and for setting the priority-level information to a non-priority in the case that the amount of data or the elapsed time is not less than the predetermined threshold, and the queue section comprises:
priority queues for each QoS type, where a packet for which the priority-level information is priority is queued;
non-priority queues for each QoS type, where a packet for which the priority-level information is non-priority is queued;
a priority-level decision module for queuing the received packet at one of the priority queues for each QoS type and the non-priority queues for each QoS type according to the QoS type included in the packet analysis information and the priority-level information set by the count module; and
a selection and transmission module which performs, for each QoS type in a descending order of the priority levels of QoS types, when the priority queue for the QoS type has a packet, dequeuing the packet from the priority queue and sending the packet to the base station network, and for, when the priority queue for the QoS type does not have a packet but the non-priority queue for the QoS type has a packet, dequeuing the packet from the non-priority queue and sending the packet to the base station network.

7. The base station according to claim 6,
wherein the control section further comprises
a priority-level determination module for receiving the packet analysis information and the priority-level information from the count module, for determining queuing-destination information of the received packet according to the QoS type included in the packet analysis information and the priority-level information, and for outputting the determined queuing-destination information, and the priority-level decision module receives the queuing-destination information from the priority-level determination module, and queues the received packet at one of the priority queue for each QoS type and the non-priority queue for each QoS type according to the queuing-destination information.

8. The base station according to claim 6,
wherein
the amount of data is the number of bytes in packets and
the count module comprises:
a data-amount-information storage segment for storing, for each terminal identifier, the total number of bytes received from when the first packet is received from the terminal to the current time, and
a data-amount count segment for obtaining the number of bytes in the received packet and for adding the obtained number of bytes to the number of bytes corresponding to the terminal identifier included in the packet analysis information by referring to the data-amount storage segment.

9. The base station according to claim 6, wherein the amount of data is the number of packets; and the count module comprises:

a data-amount-information storage segment for storing, for each terminal identifier, the total number of packets received from when the first packet is received from the terminal to the current time, and a data-amount count segment for, when receiving a packet, increasing the number of packets corresponding to the terminal identifier included in the packet analysis information by referring to the data-amount storage segment.

10. The base station according to claim 6, wherein the count module comprises:

a receiving-time storage segment for storing, for each terminal identifier, the time when the first packet is received from the terminal, and an elapsed-time calculation segment for, when receiving the packet analysis information, calculating according to the current time and the time corresponding to the terminal identifier included in the packet analysis information by referring to the receiving-time storage segment, an elapsed time from when the first packet is received from the terminal to the current time.

11. The base station according to claim 6, wherein, when a radio resource is obtained between the terminal and the base station, or when a packet priority instruction for handling a packet of a specified terminal with priority is received from the base-station network, the control section sets on a first-time flag corresponding to the terminal, and when a packet is received from the terminal while the first-time flag is on, the control section initializes the amount of data or the elapsed time in the count module and sets off the first-time flag.

12. A base-station controller apparatus comprising:

a first interface for communicating with a base station;

a second interface for communicating with a network;

a packet processing section for applying signal processing that includes switching to a signal exchanged between the first interface and the second interface;

a queue section for buffering a packet to the base station and for sending the packet to the base station; and a control section for sending with priority a predetermined amount of packets to newly connect a terminal and a base station network, wherein the control section comprises:

a packet analysis module for receiving a packet from the packet processing section, for generating a packet analysis information that includes a terminal identifier of a transmission destination by referring to the packet, and for outputting the received packet and the packet analysis information; and a count module for receiving the packet analysis information from the packet analysis module, for obtaining, for each terminal identifier included in the packet analysis information, the amount of data sent to the terminal from when a first packet is sent at a current time, or an elapsed time from when the first packet is sent to a terminal to the current time, for setting priority-level information to a priority in the case that the amount of data or the elapsed time is less than a predetermined threshold, and for setting the priority-level information to a non-priority in the case that the amount of data or the elapsed time is not less than the predetermined threshold, and the queue section comprises:

a priority queue where a packet for which the priority-level information is the priority is queued;

a non-priority queue where a packet for which the priority-level information is the non-priority is queued;

a priority-level decision module for queuing the received packet at one of the priority queue and the non-priority queue according to the priority-level information set by the count module; and a selection and transmission module for, when the priority queue has a packet, dequeuing the packet from the priority queue and sending the packet to the base station corresponding to the terminal of the transmission destination, and, when the priority queue does not have a packet but the non-priority queue has a packet, dequeuing the packet from the non-priority queue and sending the packet to the base station corresponding to the terminal of the transmission destination.

13. A base-station control apparatus according to claim 12, wherein, when a radio resource is obtained between the terminal and the base station, or when a packet priority instruction for handling a packet of a specified terminal with priority is received from the base-station network, the control section sets on a first-time flag corresponding to the terminal, and when a packet to the terminal is received while the first-time flag is on, the control section initializes the amount of data or the elapsed time in the count module and sets off the first-time flag.

14. A base-station controller apparatus comprising:

a first interface for communicating with a base station;

a second interface for communicating with a network;

a packet processing section for applying signal processing that includes switching to a signal exchanged between the first interface and the second interface;

a queue section for buffering a packet to the base station and for sending the packet to the base station; and a control section for sending with priority a predetermined amount of packets to newly connect a terminal and a base station network, wherein the control section comprises:

the packet analysis module for receiving a packet from the packet processing section, for generating packet analysis information that includes a terminal identifier of a transmission destination and a QoS type by referring to the packet, and for outputting the received packet and the packet analysis information; and a count module for receiving the packet analysis information from the packet analysis module, for obtaining, for each terminal identifier included in the packet analysis information, an amount of data sent to the terminal when a first packet is sent to a current time, or an elapsed time from when the first packet is sent to the terminal to a the current time, for setting priority-level information to a priority in the case that the amount of data or the elapsed time is less than a predetermined threshold, and for setting the priority-level information to a non-priority in the case that the amount of data or the elapsed time is not less than the predetermined threshold, and the queue section comprises:

priority queues for each QoS type, where a packet for which the priority-level information is the priority is queued;

non-priority queues for each QoS type, where a packet for which the priority-level information is the non-priority is queued;

a priority-level decision module for queuing the received packet at one of the priority queues for each QoS type and the non-priority queues for each QoS type according to the QoS type included in the packet analysis information and the priority-level information set by the count module; and a selection and transmission module which performs, for each QoS type in a descending order of the priority levels of QoS types, when the priority queue for the QoS type has a packet, dequeuing the packet from the priority queue and sending the packet to the base station corresponding to the terminal of the transmission destination, and, when the priority queue for the QoS type does not have a packet but the non-priority queue for the QoS type has a packet, dequeuing the packet from the non-priority queue and sending the packet to the base station corresponding to the terminal of the transmission destination.

15. A base-station control apparatus according to claim 14, wherein, when a radio resource is obtained between the terminal and the base station, or when a packet priority instruction for handling a packet of a specified terminal with priority is received from the base-station network, the control section sets on a first-time flag corresponding to the terminal, and when a packet to the terminal is received while the first-time flag is on, the control section initializes the amount of data or the elapsed time in the count module and sets off the first-time flag.

* * * * *